US006869158B2

(12) United States Patent
Kojima et al.

(10) Patent No.: US 6,869,158 B2
(45) Date of Patent: Mar. 22, 2005

(54) LIQUID CONTAINER WITH IDENTIFYING MEANS AND METHOD FOR DETECTING STATE OF MOUNT OF LIQUID CONTAINER

(75) Inventors: Yoshinori Kojima, Kawasaki (JP); Masanori Takenouchi, Yokohama (JP); Hajime Yamamoto, Fuchu (JP); Masahiko Igaki, Yokohama (JP); Eiichiro Shimizu, Hong Kong (HK); Yasuo Kotaki, Yokohama (JP); Kenji Kitabatake, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/395,161

(22) Filed: Mar. 25, 2003

(65) Prior Publication Data

US 2004/0017445 A1 Jan. 29, 2004

(30) Foreign Application Priority Data

Mar. 29, 2002 (JP) ....................................... 2002/095264

(51) Int. Cl.[7] ......................... B41J 29/393; B41J 2/175; B41J 2/195; G01D 5/34

(52) U.S. Cl. ............................... 347/19; 347/7; 347/86; 250/231.13

(58) Field of Search ................................ 347/7, 19, 86, 347/9; 73/393; 250/577, 231.13

(56) References Cited

U.S. PATENT DOCUMENTS 5,616,929 A 4/1997 Hara .......................... 250/573
5,997,121 A * 12/1999 Altfather et al. ............... 347/7
6,274,880 B1 * 8/2001 Walker ....................... 250/577
6,361,136 B1 3/2002 Watanabe et al. .............. 347/7
6,454,400 B1 9/2002 Morita et al. ................. 347/86
6,578,941 B2 * 6/2003 Arai et al. ...................... 347/7
2001/0035887 A1 11/2001 Altfather et al. ............... 347/7
2002/0005869 A1 1/2002 Locher et al. ................. 347/7

FOREIGN PATENT DOCUMENTS

| | | |
|---|---|---|
| EP | 860284 | 8/1998 |
| JP | 9-174877 | 7/1997 |
| JP | 10-230616 | 9/1998 |
| JP | 10-323993 | 12/1998 |

* cited by examiner

*Primary Examiner*—Stephen D. Meier
*Assistant Examiner*—Alfred E. Dudding
(74) *Attorney, Agent, or Firm*—Fitzpatrick, Cella, Harper & Scinto

(57) ABSTRACT

A liquid container for containing liquid includes a reflection member having a plurality of roof mirror assemblies arranged in a predetermined direction, each of the roof mirror assemblies having at least two reflecting surfaces positioned with a predetermined angle therebetween; wherein the reflection member is effective to divide incident light into a plurality of light beams by the plurality of roof mirror assemblies and to condensing at a predetermined position the beams sequentially reflected by the at least two reflecting surfaces of the roof mirror assemblies; wherein the reflection member is effective to divide incident light into a plurality of light beams by the plurality of roof mirror assemblies and to condensing at a predetermined position the beams sequentially reflected by the at least two reflecting surfaces of the roof mirror assemblies.

23 Claims, 25 Drawing Sheets

(a)

(b)

(c)

(a)

(b)

LIQUID CONTAINER WITH IDENTIFYING MEANS AND METHOD FOR DETECTING STATE OF MOUNT OF LIQUID CONTAINER

FIELD OF THE INVENTION AND RELATED ART

The present invention relates to a liquid container equipped with an improved and preferable identifying means to be usable with a liquid-jet recording apparatus, for example, an ink jet recording apparatus. It also relates to a method for detecting the state of mount of a liquid container in a recording apparatus.

There are various recording apparatuses which are capable of functioning as a printer, a copying machine, a facsimile machine, etc., and are usable as an output device for a compound electronic device, for example, a computer, a wordprocessor, a workstation, etc. These recording apparatuses are structured so that they record an image (inclusive of letters, symbol, etc.) on recording medium such as paper, fabric, plastic sheet, OHP sheet, etc., based on recording information. They may be classified into a plurality of types, based on their recording methods; for example, they can be classified into: ink jet type, wire dot type, thermal type, laser beam type, and the like.

Among these types of recording apparatuses, an ink jet recording apparatus records an image on recording medium by ejecting ink from its recording means onto the recording medium. Its recording means can be easily made compact. Further, it is capable of recording a highly precise image at a high speed. In particular, an ink jet recording apparatus employing a recording means characterized in that the ejection orifice count in terms of the vertical direction of the recording medium is greater than that in the horizontal direction, can be further increased in recording speed. In addition, an ink jet recording apparatus is capable of recording on ordinary recording paper, without giving the ordinary recording paper a special treatment. Therefore, it is smaller in running cost. Further, with the use of a plurality of inks (for example, color inks), it is capable of easily recording a color image. In other words, an ink jet recording apparatus boasts various advantages over its counterparts.

An ink jet recording apparatus of the above described type employs a recording head (ink jet head) as a recording means. In order to record an image, it ejects ink droplets from the microscopic ejection orifices of its ink jet head, in such a pattern that as the ink droplets land on recording medium (recording sheet or the like), they form an intended image. There are various types of ink jet head. For example, there is a type employing electromechanical transducers, such as an piezoelectric element, as the ejection energy generation element for generating the energy for ejecting ink from the ejection orifice, and a type employing electrothermal transducers having a heat generating resistor for heating the liquid in order to eject ink droplets.

An ink jet recording apparatus such as the ones described above has a liquid supply system for supplying recording ink in liquid form to its recording means (recording head). The liquid supply system is structured so that an ink container (liquid container) storing ink can be removably connected to the liquid supply system. Further, the ink container as a liquid container is structured so that it can be removably mounted in the ink container mounting portion of an ink jet recording apparatus.

There are roughly two types of configuration for a replaceable ink container employed by an ink jet recording apparatus which prints in color with the use of a recording means (recording head). In one configuration, a replaceable ink container for black ink is discrete from a replaceable color ink container having three ink chambers which contain three color inks, that is, yellow, magenta, and cyan color inks, one for one, whereas in the other configuration, each of black, yellow, magenta, and cyan inks is stored in its own discrete replaceable container.

As the method for recognizing or identifying an ink container of one of the above described types from the other, there are electrical methods based on the information in ROMs, mechanical methods based on the difference in ink container shape, optical methods based on the difference in optical reflection, etc. Japanese Laid-open Patent Application 10-323993 discloses one of the optical systems, as a liquid container identification system, according to which the bottom wall of each container is provided with a recess, in the form of a polygonal pillar, for detecting the ink container presence, or absence. Japanese Laid-open Patent Application 10-230616 discloses another optical system, according to which a liquid container (ink container) is provided with a container presence (absence) detection portion, more specifically, a portion of the surface of the liquid container has been processed into a mirror. Japanese Laid-open Patent Application 9-174877 discloses another optical ink container identification system, according to which a piece of reflective film, reflective foil, or reflective tape, is placed on the surface of the reflective element, for ink container identification.

FIG. 22 is a perspective view of an ordinary ink jet recording apparatus, for showing the general structure thereof. As shown in FIG. 22, an ink cartridge 20 comprises a recording head 1, and an ink container 7 connected thereto to supply ink to the recording head 1. The ink cartridge 20 is structured so that the recording head 1 and ink container 7 are separable from each other as will be described later. However, a recording apparatus may be made with an ink cartridge, the recording head and ink container of which are integral.

The bottom wall of the ink container 7 has an optical prism (unshown) for detecting the remaining amount of ink, and a recess having an optically reflective surface (unshown) for detecting the ink container presence, or absence.

The ink jet recording apparatuses of the above described types, in particular, those which employ the combination of a thermal energy generating means (electrothermal transducer, laser, etc.) for generating the thermal energy for ejecting ink, and a recording method which changes the state of ink with the use of the thermal energy generated by the thermal energy generating means, are capable of recording at a high density; they are capable of recording a more precise image.

Also referring to FIG. 22, the ink jet recording apparatus has an optical unit 14 for detecting the remaining amount of the ink and the ink container presence, or absence. The optical unit 14 comprises an infrared LED (light emitting diode) 15 and a phototransistor (photosensitive element) 16. The light emitting diode 15 and photosensitive element 16 are disposed next to each other, aligning in the direction in which recording paper is conveyed (direction indicated by arrow mark F). The optical unit 14 is attached to the chassis 17 of the main assembly of the apparatus. Referring to FIG. 20, as the carriage 2, on which the ink cartridge 20 is borne, is moved rightward from the position shown in FIG. 20, the ink cartridge 20 is moved to the position at which the state of the ink in the ink container 7, and the ink container presence or absence, can be detected by the optical unit 14, through or from the bottom wall of the ink container.

FIG. 23 is an external perspective view of a head holder 200 for holding the ink container 7 and recording head 1. FIG. 23(A) shows the head holder 200, and the ink container 7 which is not in the head holder 200, whereas FIG. 23(B) shows the head holder 200, and the ink container 7 which is in the head holder 200. FIG. 24 is a schematic drawing for showing the structure of the ink container 7, FIGS. 24(*a*), 24(*b*), and 24(*c*) being an external perspective view of the ink container 7, a plan view of the bottom surface of the ink container 7, and a sectional view of the ink container 7 at Plane A—A in FIG. 24(*a*), respectively.

Referring to FIG. 23, a referential numeral 200 designates the head holder into which the above described ink container 7 is mounted, and which is integral with the recording head. It holds, for example, ink containers 7 (7C, 7M, and 7Y) for containing cyan (C), magenta (M), and yellow (Y) inks, respectively. The bottom portion of the head holder 200 has the recording head 1, which ejects the above listed color inks, and which is an integral part of the bottom portion of the head holder 200. The bottom portion of the head holder 200 also has a window (unshown) through which the ink presence (absence) and ink container presence (absence) can be detected by an ink presence (absence) detecting portion, and an ink container presence (absence) detecting portion, respectively.

Referring to FIG. 24(*a*), the ink container 7 has a triangular notch 250, which is at the bottom edge of the side wall. Referring to FIGS. 24(*b*) and 24(*c*), the ink container 7 also has a prism 180 and a concave reflective portion 190. The prism 180 is attached to the bottom surface of the ink container 7. The concave reflecting portion 190 is an integral part of the bottom wall of the ink container 7, and faces outward of the ink container 7. The prism 180 is used for detecting the remaining amount of the ink in the ink container 7, and the concave reflective portion 190 is used for detecting the ink container presence or absence.

Referring to FIG. 24(*b*), the concave reflective portion 190 is structured so that the entirety of its reflective surface is concavely arcuate in terms of the direction in which the ink container 7 borne on the carriage shuttles as the carriage is shuttled, that is, the moving direction of the carriage, as well as the direction (direction F) in which the light emitting element 15 and photosensitive element 16 are aligned, that is, the direction perpendicular to the moving direction of the carriage.

FIG. 25 shows ink containers, the optical unit 14 of each of which is at the normal position. In this case, the light emitting portion of the light emitting element 15 of the optical unit 14, and the photosensitive portion of the photosensitive element 16 of the optical unit 14, are near the center 18 of the concavely arcuate surface of the concave reflective portion 190. Further, they are in such positions that the central axis of the beam of infrared red light emitted from the light emitting element 15 is parallel to the direction perpendicular to the bottom wall of the ink container 7.

Referring to FIG. 26, FIG. 26(A) shows the structure of the bottom portion of each of the plurality of ink containers 7 containing the plurality of color inks, one for one, and FIG. 26(B) shows the difference among the plurality of the ink containers 7, specifically in the amount of the light reflected by their bottom surfaces. As shown in FIG. 26, three ink containers 7, which contain three inks, one for one, different in color (yellow (Y), magenta (M), cyan (C)), are disposed side by side and in parallel. Each ink container 7 has its own concave reflective portion 190.

As the carriage bearing the ink containers 7 structured as described above is moved, the amount of the light received by the photosensitive element 16, which is shown in FIG. 23, changes as shown in FIG. 26. In FIG. 26, the solid line represents the case in which all three ink containers 7 are on the carriage 2, whereas the broken line represents the case in which only the magenta ink container 7 is missing.

However, the prior art regarding a liquid container, as an ink container, having the above described optical reflective portion has the following problems. Generally, the resinous material for an ink container must be selected in consideration of its compatibility with ink, cost, etc. Further, generally, a resinous substance is not ideal in terms of optical properties. Thus, even if an ink container is provided with a concave reflective portion, such as the above described one, to condense the light it receives, it is necessary that the amount by which the light emitting portion emits light is substantial, or the light emitting portion is provided with a condenser lens, and/or that a very sensitive sensor is employed as the sensor of the photosensitive portion.

Japanese Laid-open Patent Application 9-174877 discloses an ink container as the solution to the above described problem. According to this patent application, the reflective surface of the ink container (liquid container) is improved in reflectivity, by making it into a mirror by deposition, or placing a piece of reflective film thereon. With this type of improvement in reflectivity, there is a sufficient amount of difference in intensity between the reflected light from the reflective portion and the reflected light from the nonreflective portion. In other words, improving the reflective portion of an ink container is one of the effective means for detecting the ink container presence. However, giving the above described treatment to an ink container, which is considered to be expendable, increases the ink container cost, which adds to the cost of an ink jet recording apparatus. Further, there is another technical problem similar to the problem peculiar to an optical reflective system (prism, concave mirror), which will be described later (presence or absence of ink container can be detected, but, ink container cannot be identified in the color of the ink therein; incomplete mounting of ink container, that is, “floating” of ink container from ink container mounting portion, cannot be detected).

The next is a problem regarding the reflective optical system (prism, concave mirror) itself. In the case of the prior art, the liquid container presence or absence can be detected, but it is impossible to identify the color of the ink in each ink container, or the manner in which a liquid container has settled in the liquid container mounting portion. In other words, even if a given ink container containing an ink of a specific color is mounted into an incorrect mounting portion, that is, the mounting portion dedicated to an ink container for the ink of another color, the mistake is not detected. Further, even if a given ink container is “floating” in the ink container mounting portion, the condition is not detected, failing to supply the recording apparatus side with a sufficient amount of ink. In these cases, an intended image sometimes cannot be obtained.

As for the means for identifying (detecting) an ink container, in terms of the color of the ink therein, with the use of the above described reflective optical member, it is possible to make a plurality of ink containers different in the positioning of the reflective optical member, according to the color of the ink therein. This method, however, is problematic for the following reason. That is, in recent years, there has been made a substantial amount of progress in the field of the technology for printing a multicolor image with the use of an ink jet recording apparatus. Therefore, a plurality of ink containers are disposed in a limited space, making it difficult to vary the plurality of ink containers different in the positioning of the reflective optical portion for the purpose of identifying the color of the ink in each ink container. In other words, the greater the number of the ink containers mounted on a carriage, the more difficult it is to successfully put this optical ink container identifying means into practical use. Further, it is extremely difficult to accurately detect (identify) the color of the ink in each ink container with the use of only a single detecting apparatus for detecting the reflective optical portion on each ink container; in other words, for accuracy, it is desired to employ a plurality of detecting apparatuses, the number of which matches the number of the ink containers. However, the employment of one detecting apparatus for each ink container increases the ink jet recording apparatus cost.

To describe the above described problem with reference to an ink jet recording apparatus which uses six or seven inks different in color, in the case of the prior art, according to which a reflective optical member is attached to each ink container, and its positioning relative to each container is varied based on the color of the ink therein, making it possible to identify the plurality of ink containers on a carriage, the ratio, in terms of size, of each reflective optical member relative to the bottom surface of each ink container remains the same regardless of the number (6–7) of ink containers different in the color of the ink therein. For the identification of an ink container based on the position of a reflective optical member thereon, however, each ink container must have six or seven different areas, to one of which a reflective optical member is attached for identification. Therefore, the ratio, in terms of size, of the total of the areas (6–7) to one of which a reflective optical member is attached, relative to the bottom surface of the ink container, is rather large. In other words, a relatively large area must be reserved for the ink container identification in terms of the color of the ink therein, reducing the latitude in ink container design. Further, the size of the area, the reflected light from which is to be detected, is greater, possibly making it necessary to increase the number of detecting apparatuses.

It is also possible to reduce the size of each reflective optical member so that the total size of six to seven areas of an ink container, to one of which a reflective optical member is attached for identification, remains small enough to occupy a relatively small portion of the bottom surface of an ink container. This arrangement, however, reduces the size of the reflective surface, reducing therefore the intensity of the reflected light, which in turn may result in an erroneous detection.

To describe in more detail with reference to a detecting apparatus as well, the side which receives the reflected light identifies a given ink container, as the reflective light from the given ink container arrives, or as the reflective light from the given ink container is detected by an amount greater than a set value. Thus, it is possible to identify each ink container with the use of only a single detecting apparatus, based on the intensity of the reflected light from the ink container. In this case, however, a small range in terms of light intensity must be divided into six to seven sub-ranges different in light intensity. Thus, in order to assure detection accuracy, it is necessary for the reflected light from the ink container to be supple, which in turns requires that the side (light emitting element) which emits light is high in output. The provision of a high output light emitting element increases the cost of the main assembly of an ink jet printer, and/or its power consumption, which is problematic.

SUMMARY OF THE INVENTION

The present invention is made in consideration of the above described problems in the prior art, and the primary object of the present invention is to provide a liquid container which can be identified in terms of the color of the ink therein, even if the liquid container (ink container) is erroneously mounted, and the state of mount (whether or not liquid container is "floating" from liquid container mounting portion, which hereinafter may be referred to as incomplete mounting) of which can be detected, in order to prevent a recording apparatus from recording an image different from an intended image, and also to provide a method for identifying a liquid container, as well as detecting the incomplete mounting of a liquid container.

According to an asepect of the present invention, there is provided a liquid container for containing liquid, comprising a reflection member having a plurality of roof mirror assemblies arranged in a predetermined direction, each of said roof mirror assemblies having at least two reflecting surfaces positioned with a predetermined angle therebetween; wherein said reflection member is effective to divide incident light into a plurality of light beams by said plurality of roof mirror assemblies and to condensing at a predetermined position the beams sequentially reflected by the at least two reflecting surfaces of the roof mirror assemblies wherein said reflection member is effective to divide incident light into a plurality of light beams by said plurality of roof mirror assemblies and to condensing at a predetermined position the beams sequentially reflected by the at least two reflecting surfaces of the roof mirror assemblies.

It is preferable that the incident light which is divergent is reflected and condensed one- or two-dimensionally by said reflection member.

It is preferable that the container further comprises an additional roof mirror assembly having reflecting surfaces which are positioned at a different predetermined angle such that reflected light which converges one- or two-dimensionally is divided and converged to different areas.

It is preferable that a light emitting element is disposed in a projected area of said reflection member below said reflection member such that reflected light is divided and converged to different areas.

It is preferable that the predetermined angle is no 90 degrees.

It is preferable that the plurality of said reflection members are disposed so that reflected light which converges one- or two-dimensionally is divided and converged to different areas.

According to another aspect of the present invention, there is provided a liquid container for containing liquid, comprising a reflection member having a plurality of roof mirror assemblies arranged at predetermined positions, each of said roof mirror assemblies having at least two reflecting surfaces positioned with a predetermined angle therebetween; wherein said roof mirror assemblies are arranged successively in a predetermined direction.

It is preferable that a space is provided at a position of contact relative to said roof mirror assembly.

According to a further aspect of the present invention, there is provided a discriminating method for a liquid container (incomplete mounting e.g.) for containing liquid, wherein said liquid container includes a reflection member having a plurality of roof mirror assemblies arranged in a predetermined direction, each of said roof mirror assemblies having at least two reflecting surfaces positioned with a predetermined angle therebetween, and said reflection member divides incident light into a plurality of light beams by said plurality of roof mirror assemblies so that light beams reflected sequentially by at least two reflecting surfaces of each of said roof mirror assemblies are condensed at predetermined positions, said method comprising the step of discriminating said liquid container on the basis of a distribution pattern of the reflected light constituted by the condensed light beams.

According to a further aspect of the present invention, there is provided a method for detecting a mounting state of a liquid container for containing liquid, wherein said liquid container includes a reflection member having a plurality of roof mirror assemblies arranged in a predetermined direction, each of said roof mirror assemblies having at least two reflecting surfaces positioned with a predetermined angle therebetween, and wherein said reflection member is effective to divide incident light into a plurality of light beams by said plurality of roof mirror assemblies and to condensing at a predetermined position the beams sequentially reflected by the at least two reflecting surfaces of the roof mirror assemblies, said method comprising detecting a mounting state of said liquid container on the basis of a change in a position of the reflected light constituted by the condensed light beams.

It is preferable that information relating to said liquid container is discriminated on the basis of a width of the reflected light from said reflection member.

It is preferable that information relating to said liquid container is discriminated on the basis of a number of the reflected light portions having peaks.

It is preferable that information relating to said liquid container is discriminated on the basis of a pitch of a pattern of the reflected light.

It is preferable that said liquid container is discriminated on the basis of a difference in peak values of the reflected light from said reflection member.

It is preferable that said liquid container is discriminated on the basis of a difference in widths of the reflected light from said reflection member.

It is preferable that said liquid container is discriminated on the basis of a difference in numbers of the reflected light from said reflection member.

It is preferable that said liquid container is discriminated on the basis of intervals of the reflected light from said reflection member.

It is preferable that the information relating to said liquid container is discriminated on the basis of diffracted light from said reflection member.

According to a further aspect of the present invention, there is provided a liquid ejection type recording apparatus for effecting recording by ejection of liquid from a liquid container, said apparatus comprising a carriage capable of carrying said liquid container which has a structure as defined above; first detecting means for discriminating said liquid container; and second detecting means for detecting a mounting state of said liquid container in said apparatus.

It is preferable that said first and second detecting means include point light source means and light receiving means.

It is preferable that the light source means emit divergent light.

It is preferable that said light source means and said light receiving means are integral with each other.

As will be described in detail in the following sections describing the embodiments of the present invention, according to one of the characteristic aspects of the preferable embodiments of the present invention, in order to identify a liquid container (ink container) in terms of the color of the ink therein, and also to detect the state of mount (incomplete mounting) of a liquid container in an apparatus, an optical reflective member comprising a plurality of roof-shaped mirrors micro-processed so that the reflective surfaces of each roof-shaped mirror are positioned at a predetermined angle relative to each other, is formed of an optically transparent substance, and is placed on a liquid container so that its reflective surface (interface) is in contact with a substance (gas in following embodiments) significantly different in refractive index from the reflective member. With the provision of the above described structural arrangement, a liquid container can be identified in terms of the color of the ink therein, using the difference in the pattern of the distribution curve of the amount of the reflected light from the reflective surfaces of each of the roof-shaped mirrors of the reflective member, positioned at the predetermined angle relative to each other, more specifically, the position, pitch, magnitude, etc., of the peaks of the distribution curve. Further, the state of mount (incomplete mounting) of a liquid container is detected based on the deviation of the spot on the photosensitive element, onto which the reflected light from the reflective member on the liquid container, condenses, from the normal spot.

According to another characteristic aspect of the present invention, the reflective portion of a reflective member is made up of a plurality of roof-shaped mirrors, capable of condensing the reflective light onto an optional spot. Therefore, the present invention makes it possible to reduce the amount of the space a reflective member requires on a liquid container (ink container), and also to increase the amount of the light a reflective member reflects without performing a special process, for example, deposition of reflective film, on the reflective surface of the reflective member. Further, each reflective member can be made different from the other reflective members, in the pattern of the distribution curve of the amount of the reflective light from a reflective member, received by the light receiving side. Therefore, a reflective member different in the configuration and arrangement of roof-shaped mirrors, from the other reflective members, can be placed on each liquid container (ink container), so that each liquid container (ink container) can be identified in terms of the color of the ink therein, and further, the state of mount (incomplete mounting) of each liquid container can be detected based on the deviation of the spot on the photosensitive element, onto which the reflective light from the reflective member on the liquid container condenses, from the normal spot.

These and other objects, features, and advantages of the present invention will become more apparent upon consideration of the following description of the preferred embodiments of the present invention, taken in conjunction with the accompanying drawings.

DESCRIPTION OF THE PREFERRED EMBODIMENTS

Hereinafter, the preferred embodiments of the present invention will be described with reference to the appended drawings. In the following description of the present invention, the members, component, portions, etc., which are designated with the same referential symbols, are the same, identical, or similar throughout the drawings.

Figure 1:
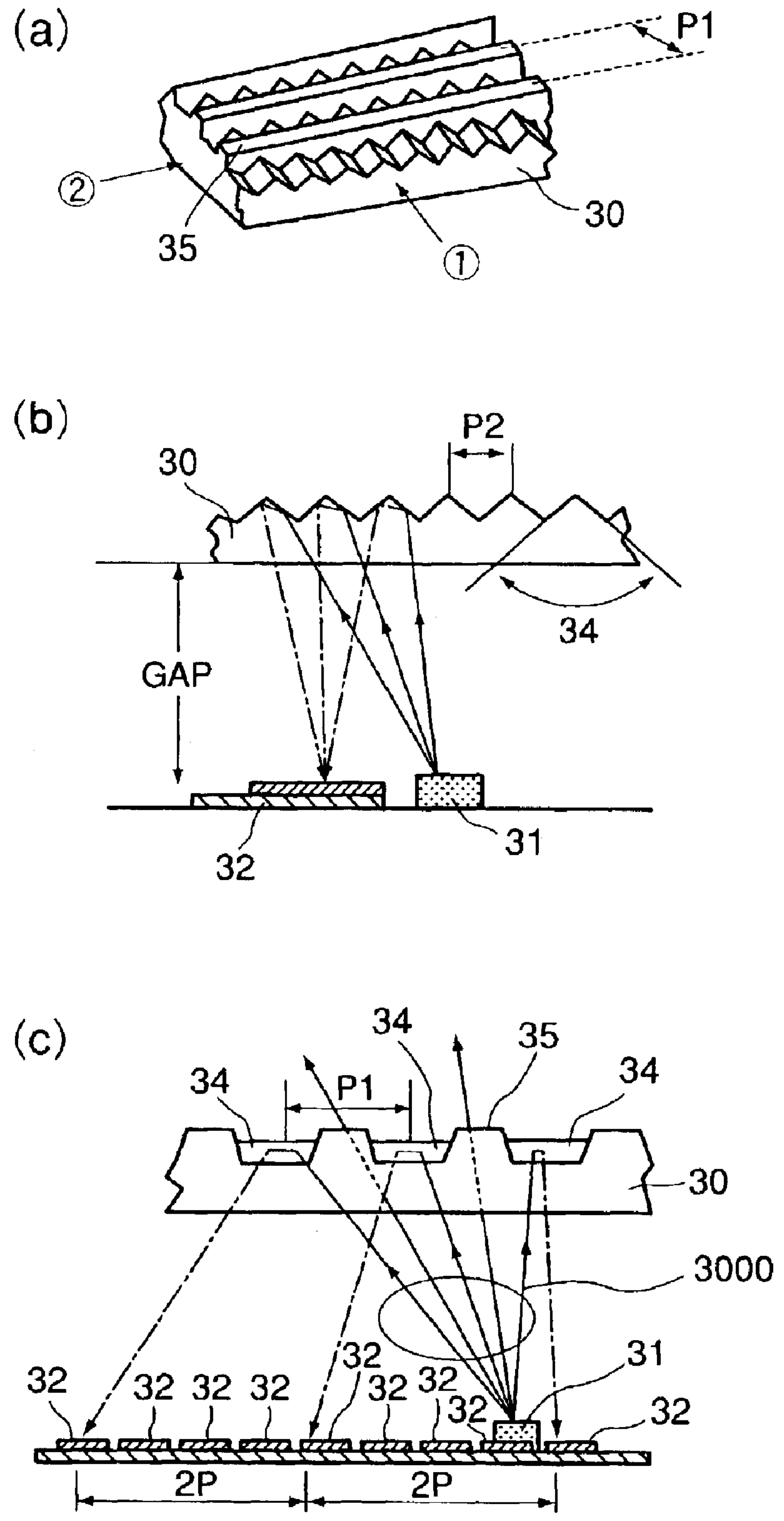
FIG. 1 is a schematic drawing for describing the optical properties of the reflective member of an ink container in accordance with the present invention, FIG. 1(*a*) being a perspective view of the reflective member, FIG. 1(*b*) being a schematic sectional view of the reflective member and detecting apparatus, as seen from the direction "1" in FIG. 1(*a*), for describing the optical relationship thereof, and FIG. 1(*c*) being a schematic sectional view of the reflective member and detecting apparatus, as seen from the direction "2" in FIG. 1(*a*), for describing the optical relationship thereof.

FIG. 1 is a drawing for describe the optical properties of a reflective member for a liquid container in accordance with the present invention. FIG. 1(*a*) is a perspective view of the reflective member, and FIG. 1(*b*) is a sectional view of the combination of the reflective member and a detecting apparatus, as seen from the direction "1" in FIG. 1(*a*), for showing the optical relationship thereof. FIG. 1(*c*) is a sectional view of the combination of the reflective member and detecting apparatus, as seen from the direction "2" in FIG. 1(*a*), for showing the optical relationship thereof.

In the case of the embodiment of an ink container shown in FIG. 1, a plurality of reflective members 30 are disposed in parallel with a pitch of P1. Each reflective member (which hereinafter may be referred to as mirror unit) 30 is transparent (formed of transparent resin, for example), and comprises a plurality of "daha" prisms (which hereinafter will be referred to as roof mirror, for convenience), arranged in parallel. A "daha" prism is a prism which is V-shaped in cross section, and has a pair of reflective surfaces positioned relative to each other at a predetermined angle (90° in this embodiment). More specifically, the top surface of the reflective member 30 has a plurality of rows of roof-shaped mirrors 34 disposed in parallel, and the bottom surface of the reflective member 30 is flat. The pitch P2 of the roof mirror in FIG. 1 is 84 μm, for example. The measurement of each roof mirror is 84 μm×100 μm.

A detecting apparatus comprises a point-source light 31 in the form of a photo IC chip, and a photosensitive element 32. It is disposed so that it will be below the reflective member 30, with the presence of a predetermined gap between the bottom surface of the reflective member 30 and the light receiving surface of the photosensitive element 32, when an ink container in accordance with the present invention is properly positioned in an ink jet recording apparatus. In FIG. 1(*b*), the light emitting side is discrete from the light receiving side. However, the two sides may be integral; in reality, an integral type emitting/receiving element is in use.

In principle, it is mandatory that the outward surface of the reflective member 30, having a contour like a row of roofs 34, is in contact with a substance, which is substantially different in refractive index from the material of the reflective member 30, and which is not in liquid form.

Referring to FIGS. 1(*b*) and 1(*c*), the paths of the light 3000 from the light emitting side to the receiving side (photosensitive element 32 in the form of photo IC chip) are represented by the combinations of solid lines and single-dot chain lines, showing the manner in which the light 3000 emitted from the emitting side (point-source light 31) are condensed after being reflected by the reflective member 30. In particular, the single-dot chain lines in the drawing represent the light paths after the reflection of the light by the roof mirrors 34. The light emitting side is not equipped with a condensing means, such as a lens. Therefore, the light 3000 is divergent.

The light 3000 (divergent light) projected from the point-source light 31 passes through the transparent reflective member 30, is reflected twice by the processed two surfaces, one for one, of the roof mirror 34, positioned relative to each other at a predetermined angle, and returns, being thereby condensed approximately in the form of a belt, to an optional point on the light receiving side (photosensitive element 31 in the form of an array). In other words, the returning light, or the reflected light, is convergent in terms of one-dimensional direction. Further, on the array of the photosensitive element 32, a grid image, the pitch of which is twice the pitch P of the reflective member, is projected as shown in FIG. 1(*c*).

Next, referring to FIGS. 2–6, a reflective member in accordance with the present invention employs a reflecting means which makes light condense only in terms of one dimension. The characteristics of this reflective member will be described in comparison to an ordinary reflective member, the reflective surface of which is flat and is coated with aluminum film.

Figure 2:
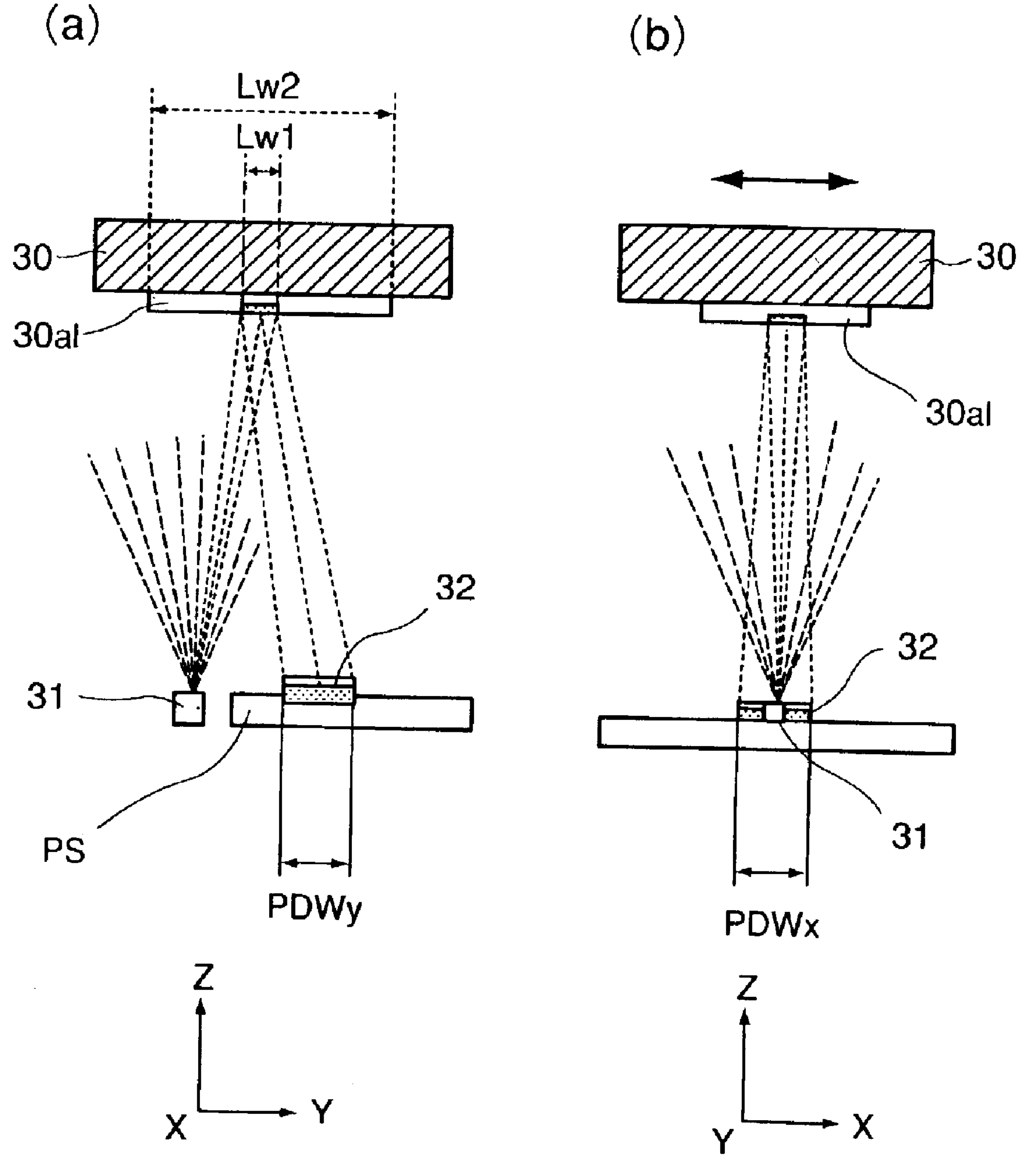
FIGS. 2(*a*) and 2(*b*) are schematic drawings for describing the optical properties of a reflective member, the flat reflective surface of which is covered with aluminum film.

FIG. 2 is a schematic drawing for describing an ordinary reflective member, the reflective surface of which is flat and is coated with aluminum film. It shows the light paths of the flux of light from the light source 31 of the photosensor PS to the photosensitive element 32 by way of the reflective surface **30*a*1 of the reflective member 30. In FIG. 2, the detecting means comprises: the light source 1; photosensitive element 32, the light receiving surface of which is PDWy×PDWx in size; and reflective member 30, the reflective surface 30*a*1 of which is coated with reflective aluminum film. The dotted lines in the drawing represent the light paths from the light source 1 to photosensitive element 32 by way of the reflective member 30. Based on geometry, the width Lw1 of the portion of the reflective aluminum film 30*a*1, corresponding to the effective flux of light, is ½PDWy:Lw1=½PDWy. Thus, if the size of the photosensitive element 32 is 400 μm, the size of the above described portion of the aluminum reflective film 30*a*1, corresponding the effective flux of light, is approximately 200 μm. In other words, the amount of the light from the light source 31, which arrives at the photosensitive element 32**, is very small.

The relationship between the gap (distance) between the photosensor PS and reflective member 30, and the amount of light received by the photosensitive element 32 is as follows:

$$\text{amount of light} \propto 1/(\text{distance})^2.$$

Figure 3:
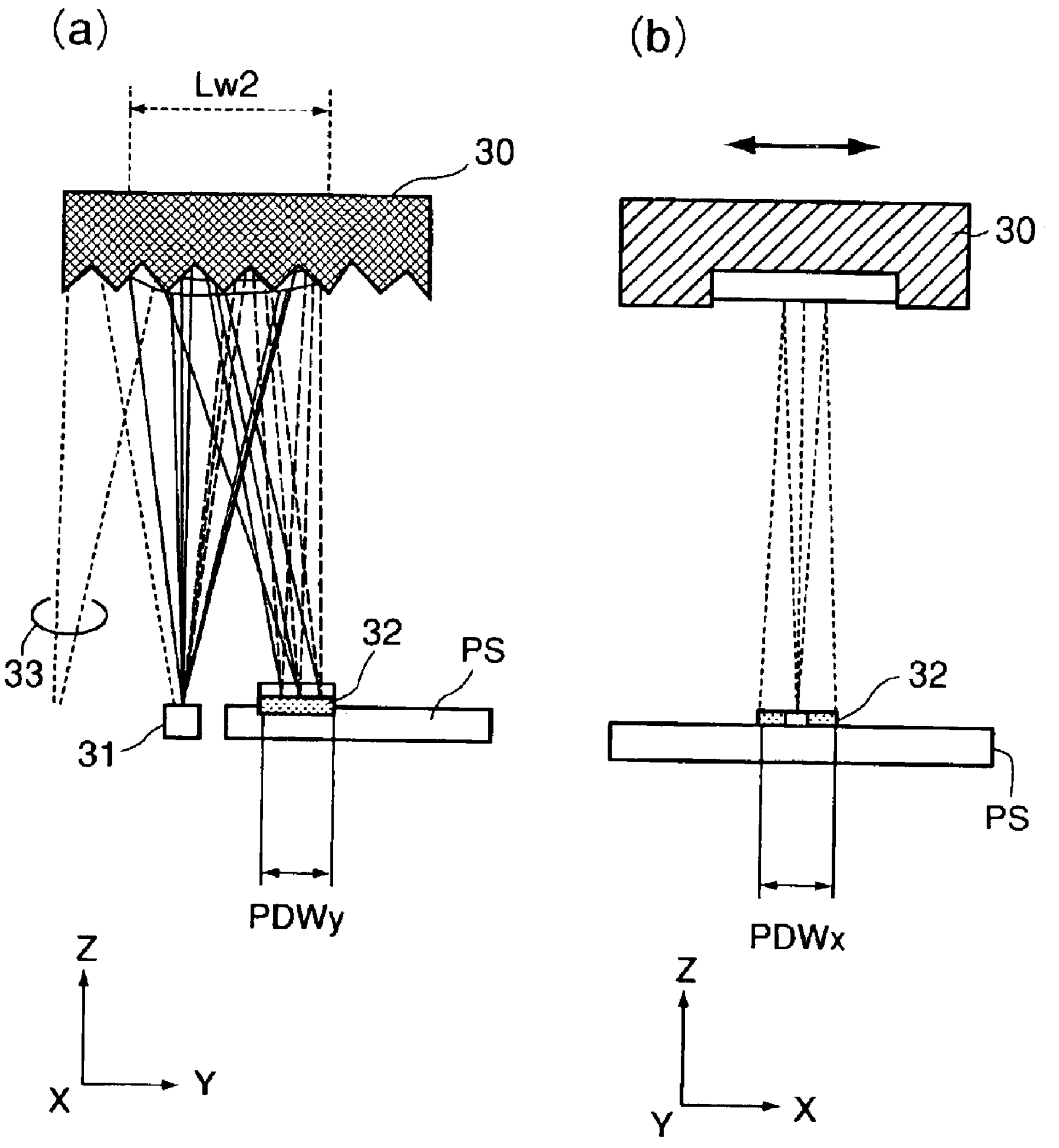
FIGS. 3(*a*) and 3(*b*) are schematic sectional views of the reflective member (called one-dimensional condensation type reflecting means, or roof-shaped mirror) in accordance with the present invention having a plurality of V-shaped grooves, each of the slanted surfaces of which constitutes the reflective surface, for showing the light paths therefrom and thereto.

FIG. 3 is a schematic drawing for showing the light paths between the reflective member 30, for a liquid container in accordance with the present invention, with the V-shaped reflective surfaces (which sometimes may be referred to as roof mirror), and the photosensitive element 32.

The two surfaces of each of the V-shaped grooves in FIG. 3 are assumed to be virtually equal in reflectivity to the above described aluminum reflective film. Thus, the angle (Ra) between the two reflective surfaces of the V-shaped groove is set to approximately 95 degrees so that the light paths become approximately the same as the preceding setup. More specifically, referring to FIG. 3(B), as seen from the direction perpendicular to the V-shaped grooves, the light paths in this setup are similar to the light paths in the preceding setup shown in FIG. 2(B); there are virtually no differences between them. However, the light paths in this setup as seen from the direction parallel to the V-shaped grooves, as shown in FIG. 3(A), are different from those in the preceding setup shown in FIG. 2(A); Lw2 in this setup is wider than Lw1 in the preceding setup. In other words, the reflective member 30 with a plurality of the roof mirrors leads a larger amount of the light from the light emitting element to the photosensitive element 32 of the photosensor PS.

There is a certain distance between the light source 31 and photosensitive element 32. Therefore, the light from the light emitting element 31 can be guided to a target receiving point by adjusting the above described angle Ra. In reality, not only is the light guided to the photosensitive element 32, but also to the location (flux of light 33 represented by dotted lines in FIG. 3(A)) symmetrical in position to the photosensitive element 32 with respect to the light source 31, since the angle Ra is set to approximately 95 degrees.

Figure 4:
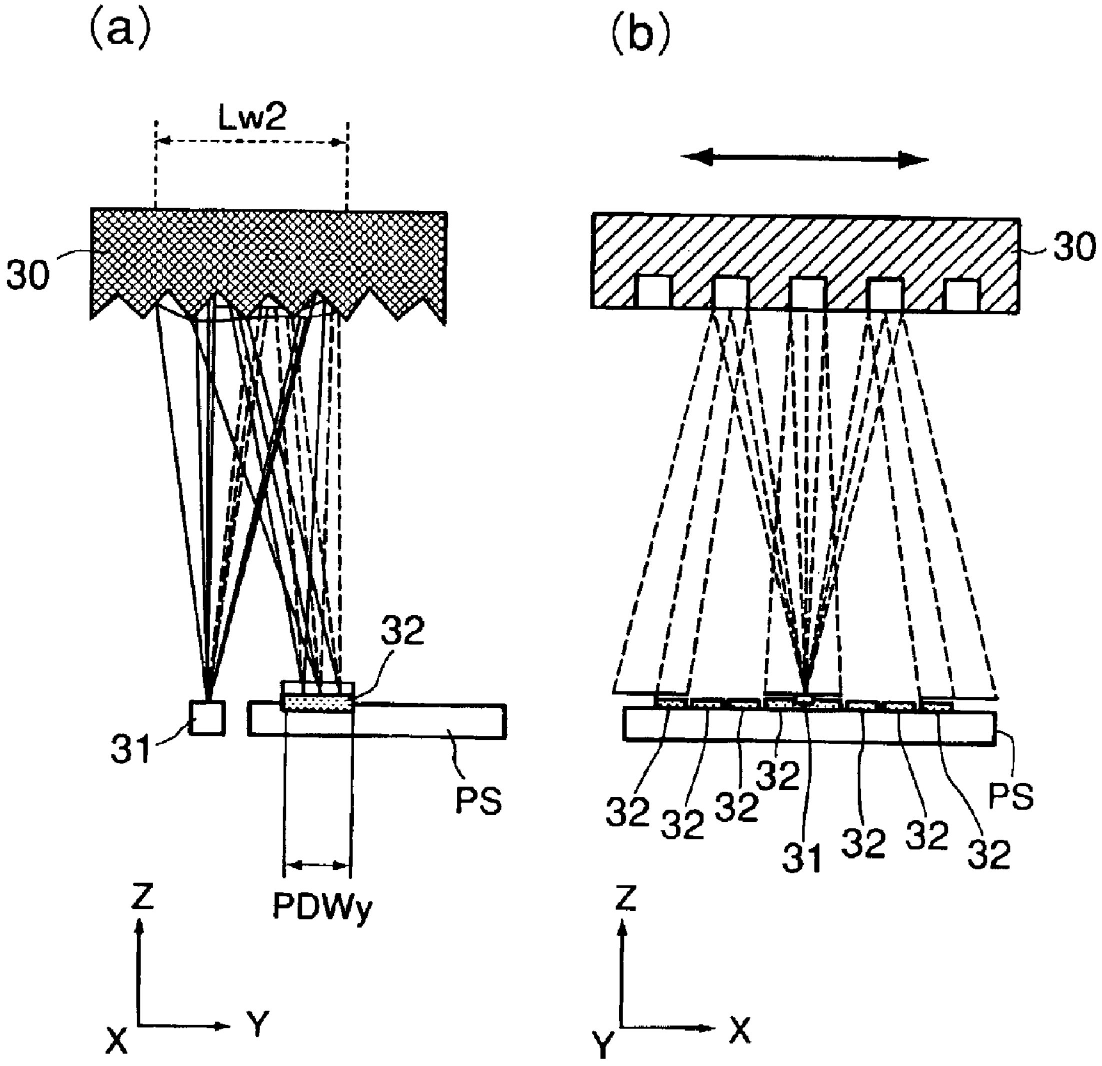
FIGS. 4(*a*) and 4(*b*) are schematic sectional views of the reflective member having a large number of V-shaped reflective grooves.

FIG. 4 is a schematic drawing of the reflective member 30 comprising a plurality of V-shaped grooves (which sometimes may be referred to as roof mirror unit). This drawing shows the approximate light paths through which the light from the light emitting element 31 of the photosensor PS is guided to the array of the photosensitive elements 32 by the reflective member 30. The effects of this setup will not be described here, because they are the same as those of the setup shown in FIG. 3. This reflective member 30 also guides a larger ratio of the light from the light emitting element 31 to the photosensitive elements 32 than the reflective member 30, shown in FIG. 2, having the flat aluminum reflective film.

Figure 5:
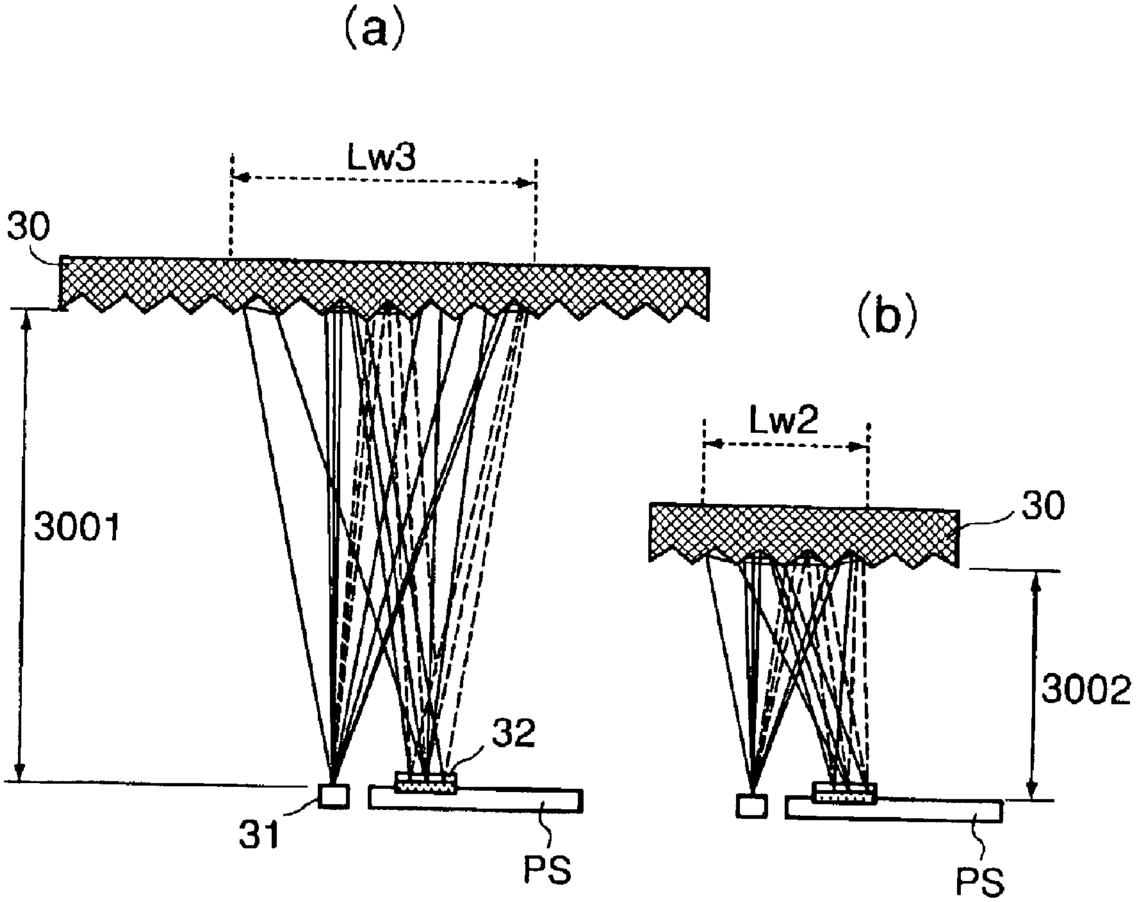
FIGS. 5(*a*) and 5(*b*) are schematic drawings for describing another effect of a reflective member in accordance with the present invention.

FIG. 5 is a schematic drawing for describing one of the effects of a reflective member for an ink container in accordance with the present invention different from the above described one. This effect relates to the properties of the gap 3001 (distance) between the photosensor PS and reflective member 30. FIG. 5(A) represents a setup in which the photosensor PS and/or reflective member 30 have been moved away from the standard positions in order to increase their distance, whereas FIG. 5(B) represents the setup in which they are at their standard positions.

In the case of the reflective member shown in FIG. 2, the amount of light detected by the photosensitive element is practically proportional to $1/(\text{distance})^2$. Therefore, if the gap 3002 in FIG. 5(A), equivalent to the distance between the reflective member and photosensor PS shown in FIG. 2, is twice, for example, the gap 3002 in FIG. 5(B), the total length of the light path, that is, the sum of the distance of the light path from the light emitting element to the reflective member, and the distance of the light path from the reflective member to the photosensitive member, in FIG. 5(A), is also twice that in FIG. 5(B). Therefore, the amount of the light detected by the photosensitive element 32 in FIG. 5(A) is approximately 25%, in practical terms, of the amount of the light detected by the photosensitive element in FIG. 5(B).

However, in the case of a reflective member of an ink container in accordance with the present invention, the amount of the light detected by the photosensitive elements 32, in terms of the direction parallel to the plane of FIG. 3(A), is not dependent on the gap (distance), as will be understood from FIGS. 5(A) and 5(B). On the other hand, the amount of the light detected by the photosensitive element, in terms of the direction parallel to the plane of FIG. 3(B), may be said to be proportional to 1/distance. In other words, a reflective member of an ink container in accordance with the present invention is also superior in terms of the effect of the changes in this gap upon the amount of the light detected by the photosensitive element.

Figure 6:
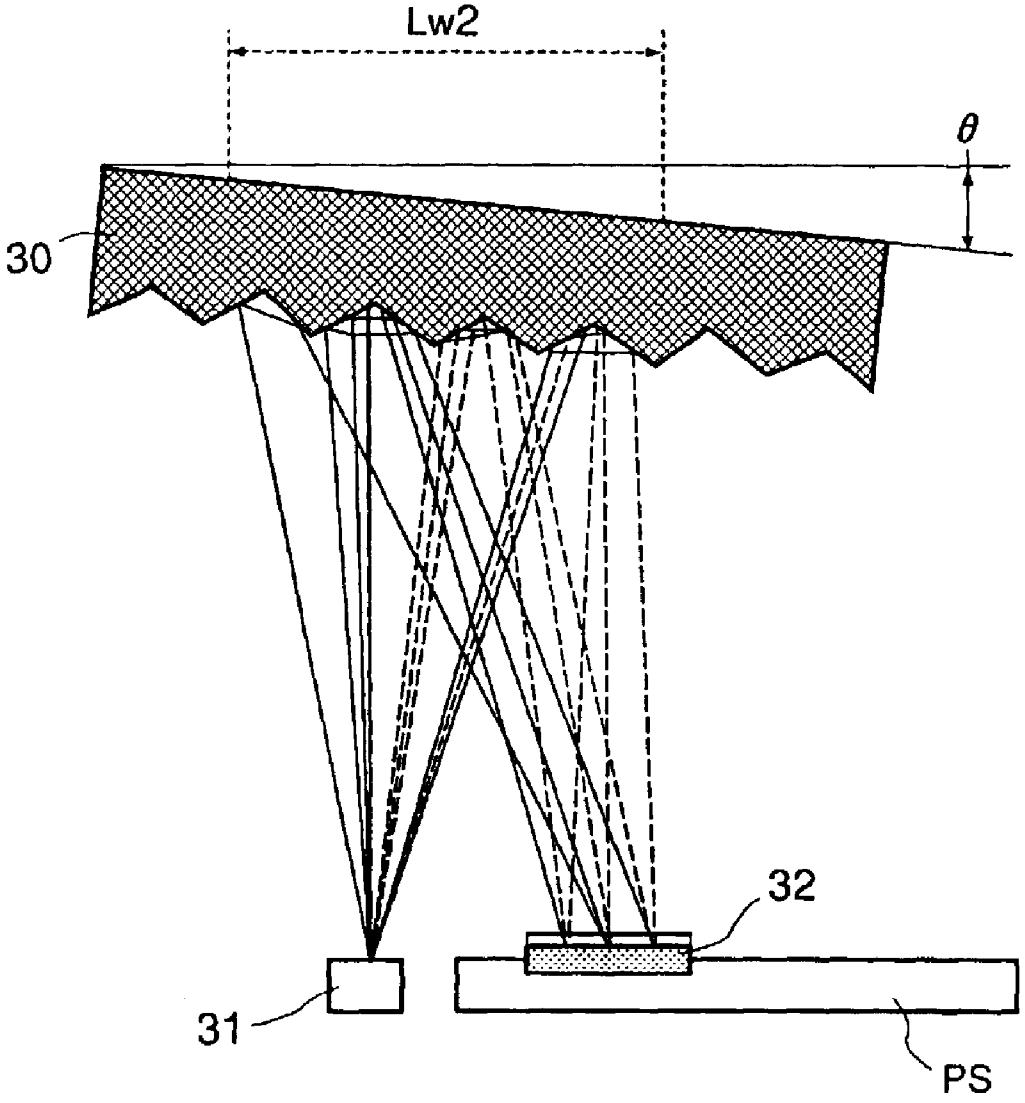
FIG. 6 is also a schematic drawing for describing yet another effect of the reflective member in accordance with the present invention.

FIG. 6 is a schematic drawing for describing another effect of a reflective member of an ink container in accordance with the present invention. As shown by this drawing, this reflective member is also superior in that even if the angle (θ) of the reflective member 30 relative to the photosensor PS changes, the manner in which the light from the light source is guided to the photosensitive portion 32 by the reflective member 30 remains virtually the same; the changes in the angle (θ) of the reflective member 30 relative to the photosensor PS have virtually no effect upon the amount of the light received by the photosensitive portion 32.

As described above, the employment of the reflective member 30 having a single or plurality of V-shaped grooves has merit in that it is greater in the absolute amount by which the light from the light emitting element 31 is guided to the photosensitive portion 32 of the photosensor PS than the reflective member, shown in FIG. 2, the reflective surface of which is flat. In other words, in the case of this reflective member 30, the reflective surface of which has a single or plurality of V-shaped grooves, even if the distance (gap) between the reflective member and photosensor varies, there is hardly any change in the amount by which the light from the light emitting element is detected by the photosensitive element. Also in the case of this reflective member 30, the amount by which the light from the light emitting element is detected by the photosensitive element is insensitive to the changes in the angle (θ) between the photosensor and reflective member; even if the angle (θ) changes, the amount of the light detected by the light receiving portion reduces very little.

Next, referring to FIG. 7, the manner in which the light from the light source 31 is two-dimensionally condensed by the reflective member will be described.

Figure 7:
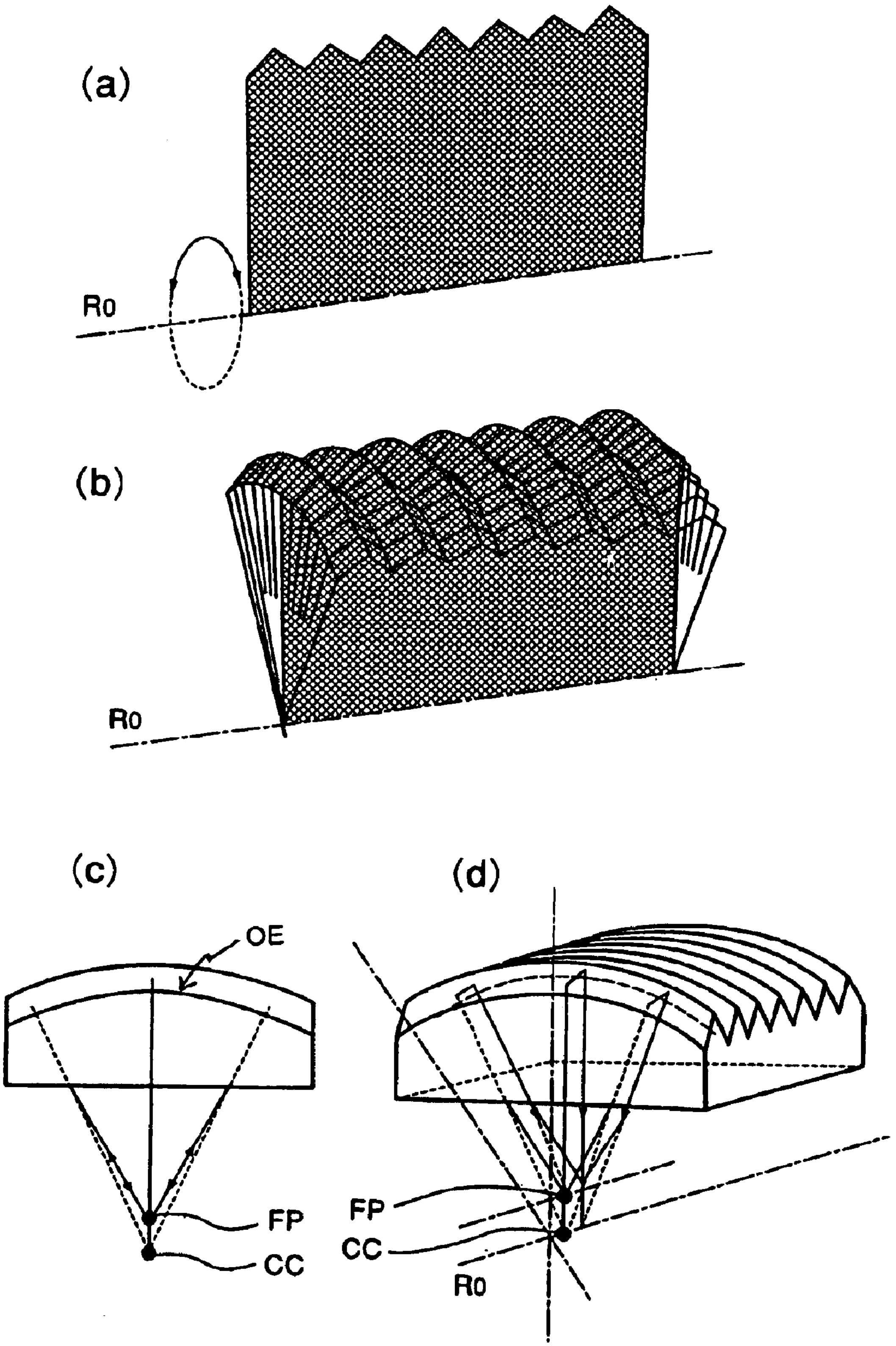
FIGS. 7(*a*) through 7(*d*) are sectional views of the reflective member (called two-dimensional condensation reflecting means, or arcuate mirror) in accordance with the present invention having a plurality of V-shaped grooves, each of the slanted surfaces of which constitutes the reflective surfaces, for showing the light paths therefrom and thereto.

FIG. 7(A) is a schematic sectional view of the above described reflective member, at a plane perpendicular to the V-shaped grooves, for describing the above described reflective properties of the reflective member. As this section of the reflective member is rotated about a rotational axis Ro, a cylindrical member, the lateral wall of which has a plurality of V-shaped grooves, as shown in FIG. 7(B) is obtained. The present invention is characterized in that a part of the V-shaped groove on the lateral surface of such a cylindrical member is used as a reflective target; the present invention is characterized by the "second reflective function" of the reflective member. More specifically, the reflective member comprises a plurality of roof mirrors or roof prisms, the reflective surfaces of which are curved in terms of the lengthwise direction of the grooves, and a part of which serves as the reflective identification target OE. In the case of the reflective member in FIG. 7, the reflective element OE is comparable to a combination of the lateral surfaces of two identical truncated cones. FIG. 7(C) is a schematic sectional view, at a plane parallel to the grooves, of an example of a reflective member made up of a plurality of the above described reflective element (OE) disposed in parallel, being aligned in the direction of Y axis, and FIG. 7(D) is a schematic perspective view of the reflective member in FIG. 7(C).

Referring to FIGS. 7(C) and 7(D), the referential sign Ro is the rotation symmetry axis of the above described V-shaped grooves, and a referential sign CC is a point on the rotation symmetry axis. A point FP is the point, to which the reflected light from the reflective member condenses when the reflective member is illuminated by divergent light from a light source disposed at this point. In other words, if the roof mirrors of a reflective member, which arranged on a flat surface, as shown in FIGS. 1–6, are arranged on a cylindrical surface as shown in FIG. 7, or a spherical surface (unshown), the reflected light from the reflective member condenses two-dimensionally.

Next, referring to FIGS. 8–12, various manners in which the reflective members having the above described optical properties are placed on a liquid container will be described.

Figure 8:
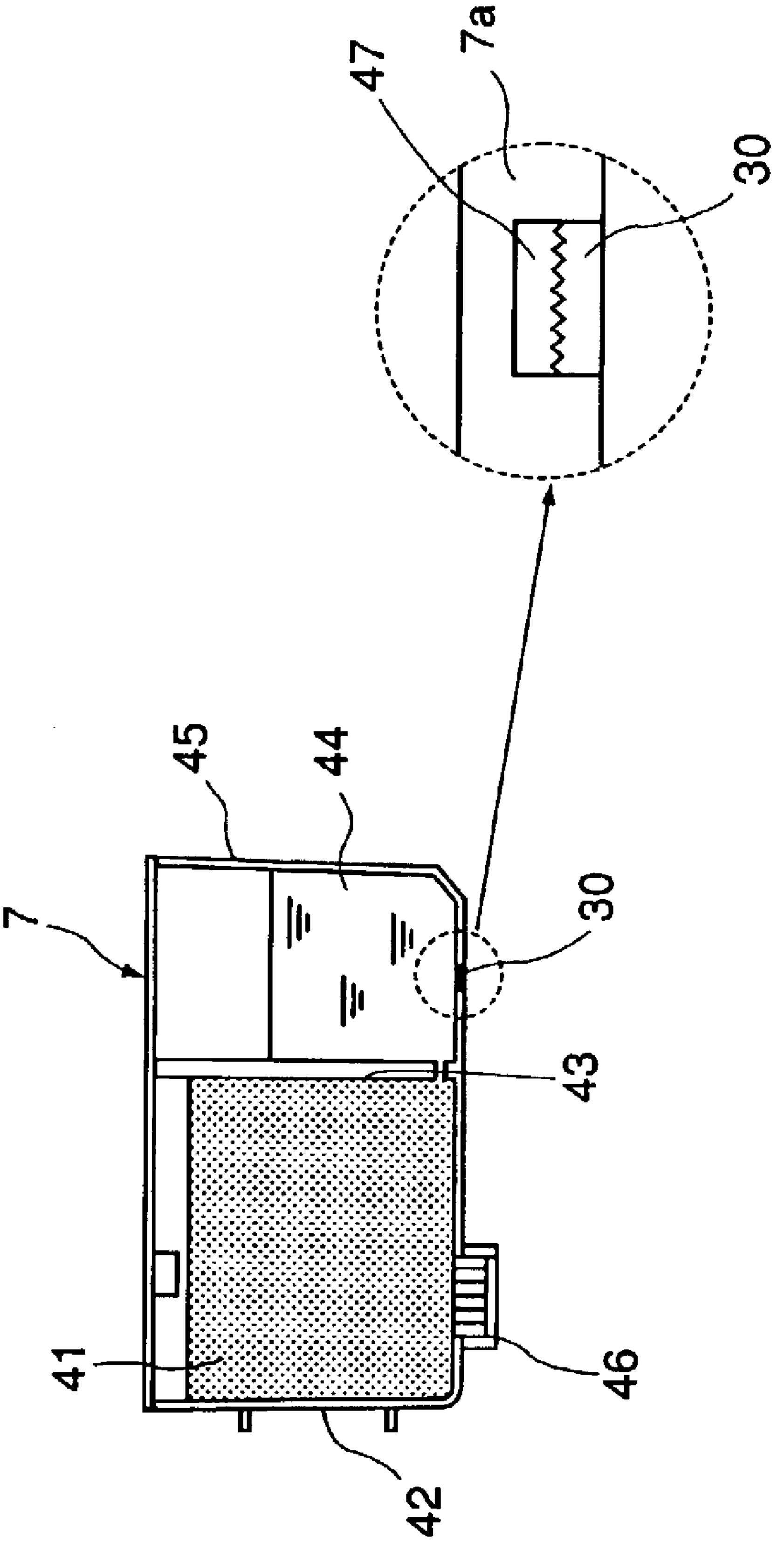
FIG. 8 is a sectional view of an embodiment of a liquid container in accordance with the present invention.

Referring to FIG. 8, herein, the reflective member 30 in accordance with the present invention having the roof mirrors will be described with reference to an ink container 7 (liquid container) comprising: an ink absorbent member chamber 42 storing an ink absorbent member 41 formed of sponge or the like; a liquid storage chamber 45 directly storing a body of ink 44; a passage 43 connecting the ink absorbent member chamber 42 and liquid storage chamber 45; and an ink outlet 46, which is attached to the ink absorbent member chamber 42, and through which the ink within the liquid container 7 is supplied to an ink jet recording head (unshown) which records an image by ejecting the ink as recording liquid. However, the reflective member 30 in accordance with the present invention having a roof mirror can be used for any liquid container.

Figure 21:
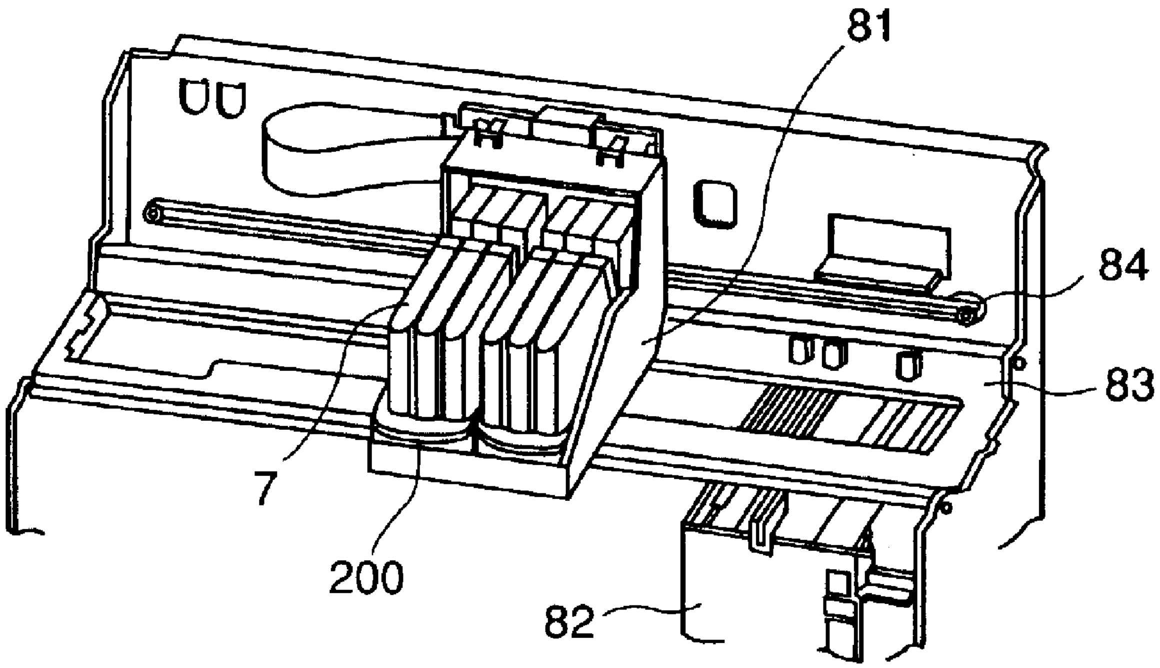
FIG. 21 is a perspective view of an example of a recording apparatus in which a liquid container in accordance with the present invention is mountable.
Figure 22:
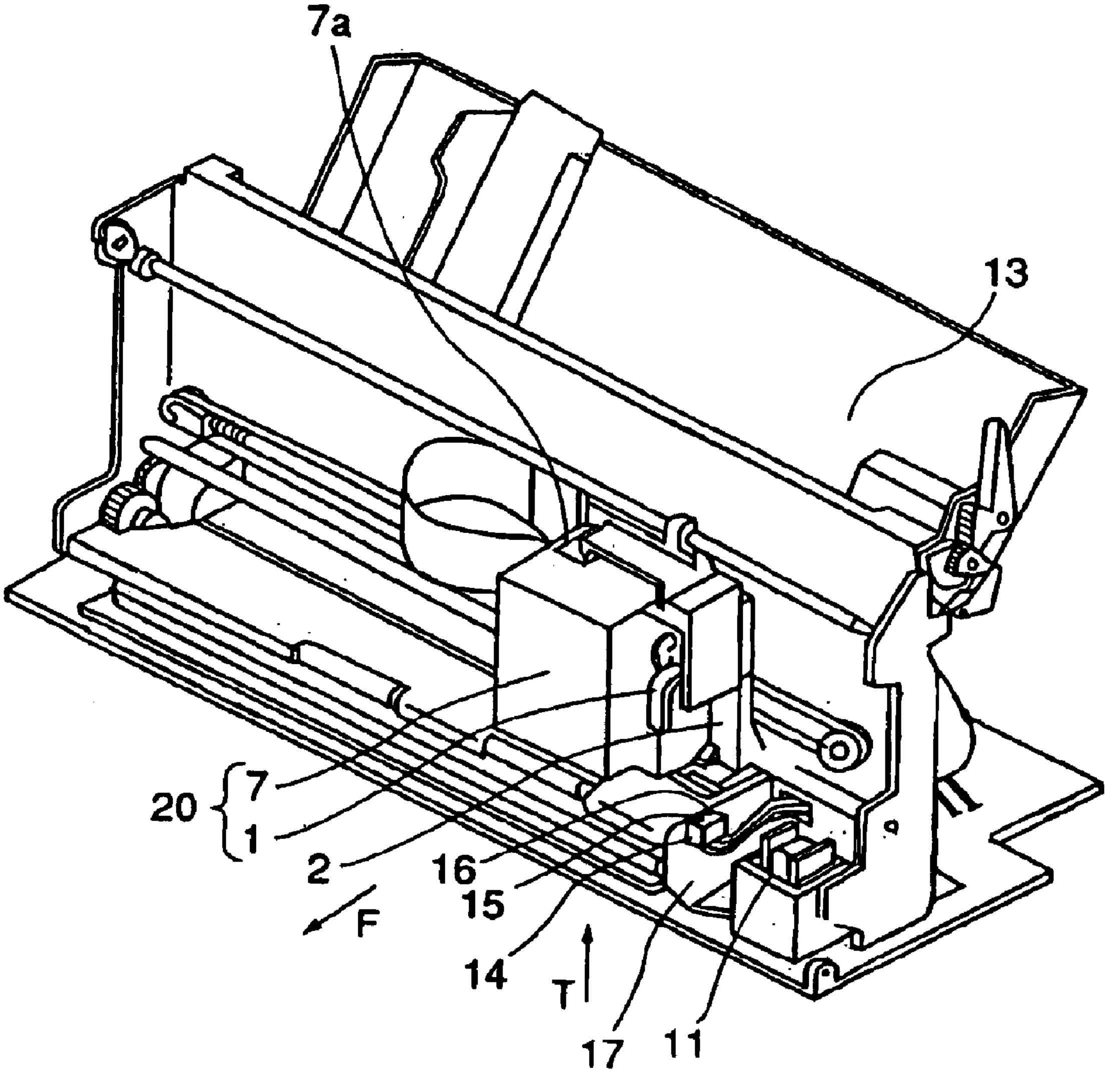
FIG. 22 is a perspective view of a typical ink jet recording apparatus having a conventional ink container detecting function, for showing the general structure thereof.
Figure 23:
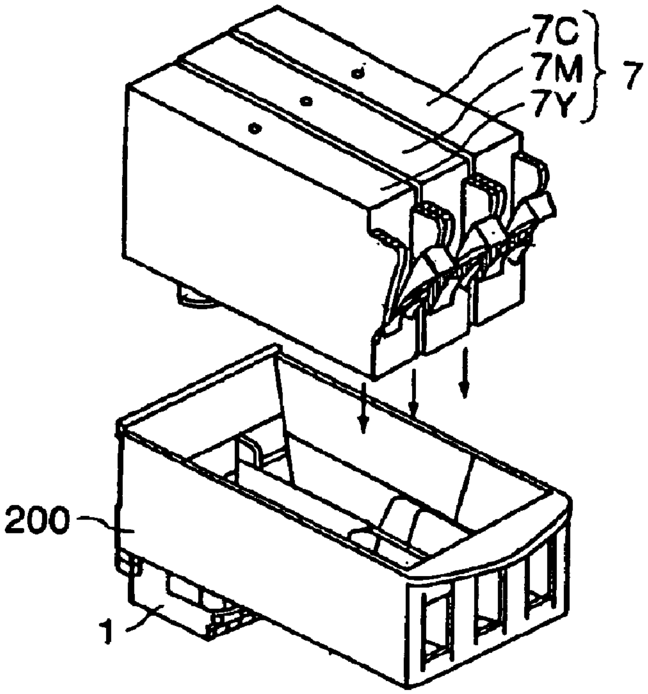
FIGS. 23(*a*) and 23(*b*) are external perspective views of the head holder, in which the ink container shown in FIG. 22 is mounted, and which has a recording head.
Figure 23:
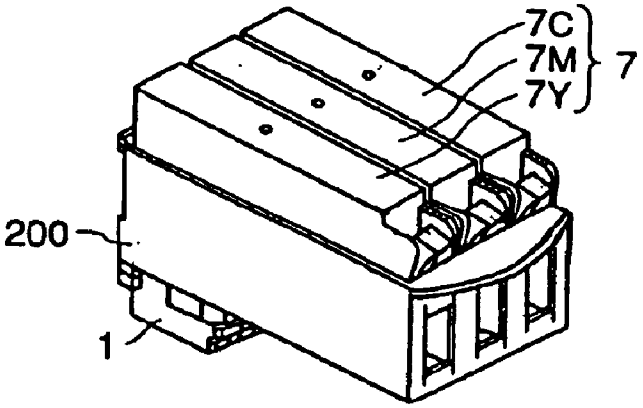
Figure 24:
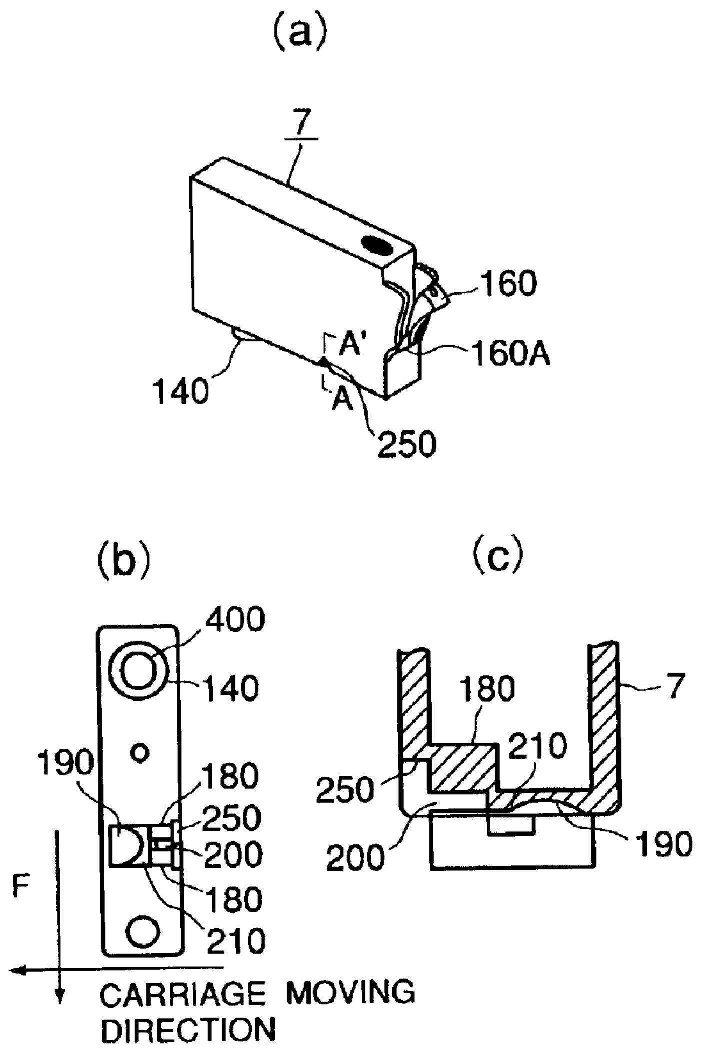
FIGS. 24(*a*) through 24(*c*) are perspective views of a typical ink container, shown in FIG. 23, in accordance with the prior art, for showing the structure thereof.
Figure 25:
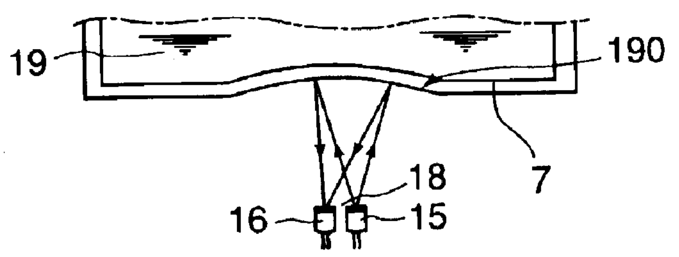
FIG. 25 is a schematic drawing for showing the reflective surface of the bottom portion of the ink container shown in FIG. 22.
Figure 26:
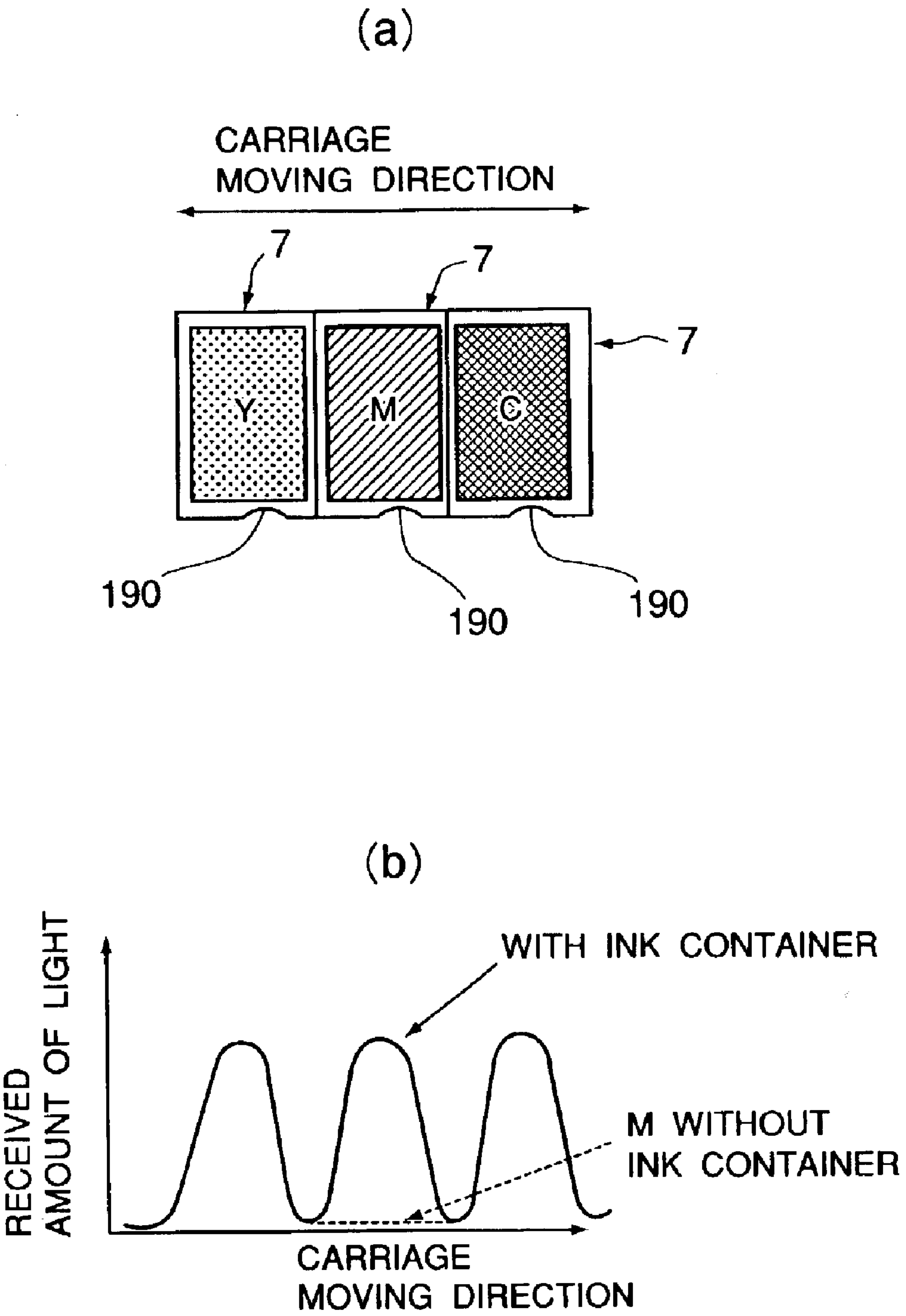
FIG. 26(A) is a schematic drawing for showing the structure of the bottom portion of each of the ink containers storing color inks one for one.
FIG. 26(B) is a graph showing the changes in the amount by which the light emitted from the light emitting element is received by the photosensitive element after being reflected by the bottom surface (reflective member) of each of the ink containers shown in FIG. 26(A).

Moreover, the reflective member 30 will be described with reference to only the structural arrangement in which the reflective member 30 is disposed on the bottom surface of a liquid container. However, it may be disposed on any surface of a liquid container, except for the surface which faces the next liquid container (ink container), affording more latitude in the positioning, for example, of the light receiving apparatus on the main assembly side of an ink jet recording apparatus (FIG. 21).

The reflective member 30 is disposed in a recess in the wall 7*a* of the ink container 7 so that the roof mirrors 34 making up the top surface of the reflective member 30 remains in contact with a nonliquid substance (air in this case) substantially different in reflectivity from the transparent resin as the material for the reflective member 30; the reflective member 30 is disposed in the recess of the wall 7*a* of the ink container 7, with the presence of a space 47 between the roof mirrors and the bottom of the recess. This reflective member 30 is compatible with various liquid containers (ink container), as long as a reflective member is formed of transparent resin, and is structured so that it can be disposed so that its reflective surface remains in contact with a substance different in reflectivity from the reflective member. Using transparent resin as the material for the reflective member 30 makes it possible to form the reflective member 30 with the use of injection molding or the like, which simplifies the reflective member manufacture.

The ink container 7 is removably mountable, alone or in plurality, on the carriage of an ink jet recording apparatus, which shuttles in the direction perpendicular to the direction in which recording sheet is conveyed. When a plurality of ink containers 7 are mounted on the carriage, they are disposed side by side in parallel so that the lengthwise direction of the ink containers becomes parallel to the shuttling direction of the carriage.

Figure 9:
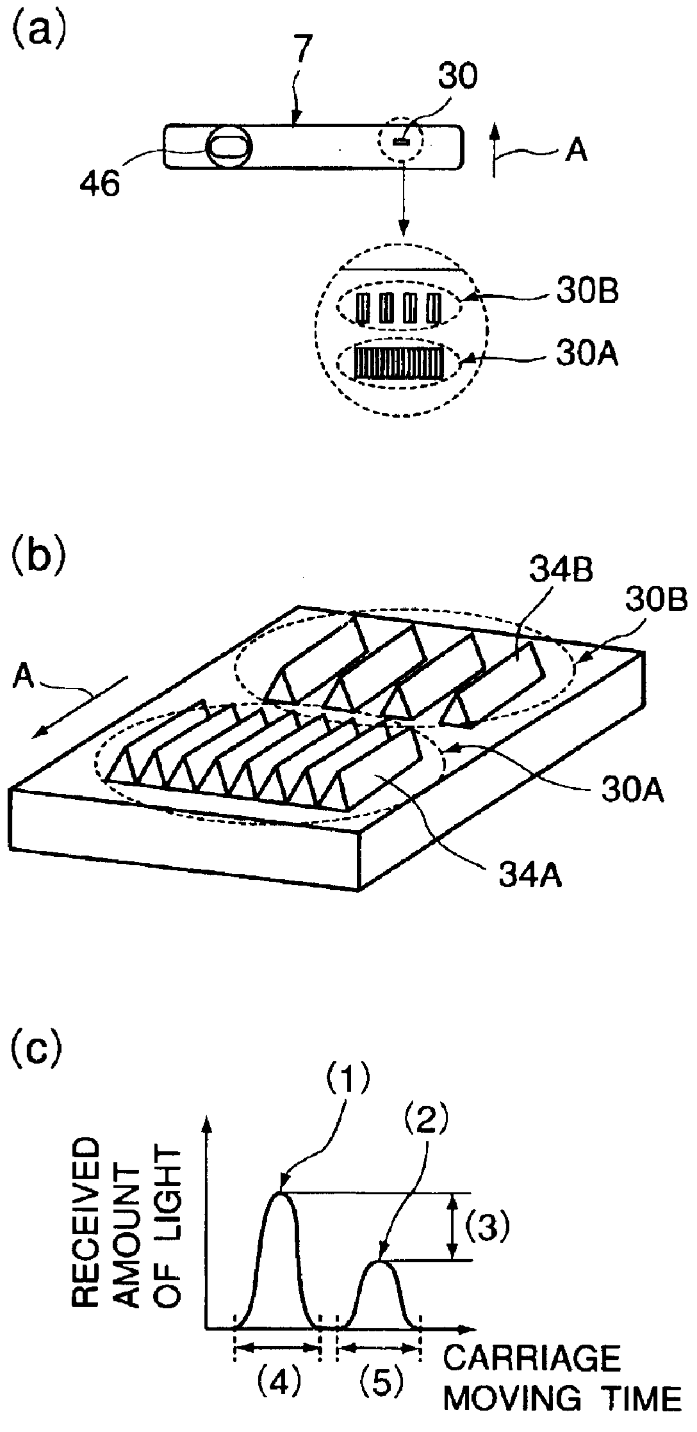
FIG. 9 is a schematic drawing for describing the reflective member of the first embodiment of liquid container in accordance with the present invention, FIG. 9(*a*) being an enlarged plan view of the roof-shaped portion of the reflective member on the bottom surface of the ink container, FIG. 9(*b*) being a perspective view of the bottom surface of the ink container having the reflective member, and FIG. 9(*c*) being a graph showing the distribution of the amount of the light received by the receiving side when the bottom surface of the ink container is provided with the reflective member, the roof-shaped mirrors of which are arranged in one of the patterns in accordance with the present invention.

Referring to FIG. 1(*c*), the adjacent two roof mirror portions of the reflective member 30 are separated by a portion 35 through which the light from below is allowed to pass upward. This portion 35 may be in the form of a wall with a flat top, higher than the ridges of the reflective surface of each roof mirror portion, as shown in FIG. 1(*a*), or may be in the form of a recess flat across the bottom. The configuration of this portion 35 may be modified according to the production method and the required degree of precision. Hereafter, the reflective member 30 will be schematically drawn without the presence of the above described portions 35, as shown in FIG. 9(*b*), FIG. 10(*b*), etc., for simplification, and will be described accordingly. Whether a reflective member in accordance with the present invention is structured as shown in FIG. 1 or FIGS. 9(*b*), 10(*b*), etc., its optical properties remain the same. The following Embodiments 1–6 relate to the structure of the reflective member for identifying a liquid container in terms of the color of the liquid therein, and Embodiment 8 relates to the structure of the reflective member for detecting whether or not a liquid container is in the proper position (improper position) in the liquid container mounting portion of a liquid ejecting apparatus.

(Embodiment 1)

FIG. 9 is a schematic drawing for describing the first embodiment of a reflective member in accordance with the present invention. FIG. 9(*a*) is an enlarged view of the roof mirror portion of the reflective member on the bottom surface of an ink container and FIG. 9(*b*) is a perspective view of the roof mirror portion of the reflective member. FIG. 9(*c*) is a graph showing the distribution of the amount of the light received by the light receiving side when a liquid container has the first embodiment of a reflective member, in which the roof mirrors are positioned as shown in FIG. 9(*b*). It should be noted here that FIG. 9 is a perspective view, as seen from diagonally above, of the side of the reflective member, which faces inward of a liquid container as the reflective member is attached to the liquid container. Hereinafter, this embodiment of the present invention will be described in detail.

Referring to FIG. 9(*a*), the reflective member 30 has first and second roof mirror units (reflective members) 30A and 30B, and is on the bottom wall of the ink container 7, with the lengthwise direction of its roof mirrors being parallel to the moving direction A (direction in which carriage is moved) of the ink container 7. The first roof mirror unit 30A has eight roof mirrors 34A, and the second roof mirror unit 30B has four roof mirrors 34B. The roof mirror 34A and roof mirror 34B are the same in terms of the depth (dimension in terms of moving direction A), and the angle between two reflective surfaces.

As the ink container 7 having the reflective member 30, the roof mirrors of which are in the above described arrangement, is moved in the direction A by the carriage, the distribution of the amount of the light received by the photosensitive element becomes as shown in FIG. 9(*c*). As will be evident from the distribution curve of the amount of the light received by the photosensitive element, relative to the elapse of time since the beginning of the movement of the carriage, two peaks (1) and (2) occur as the ink container 7 is moved in the direction A. These peaks (1) and (2), which are different by a difference (3), occur because of the difference in the number of the roof mirrors between the first and second roof mirror units 30A and 30B, in which the roof mirrors are disposed in parallel so that their lengthwise direction is parallel to the carriage movement direction A. Referring to FIG. 9(*c*), the lengths (4) and (5) of time are the same.

In the case of this embodiment, the information regarding each ink container 7 can be obtained by detecting the values of the peaks (1) and (2) of the distribution curve of the amounts of the light received by the first and second roof mirror units 30A and 30B, respectively, and also, the difference (3) between the values of the two peaks (1) and (2). As for the discrimination among the plurality of ink containers arranged in parallel on the carriage, the reflective member on each ink container is made different from the reflective members on the other ink containers, in terms of the value of the peak of the distribution curve of the amount of the light received by the photosensitive element, different among the peaks, so that the plurality of ink containers can be differentiated. The peak mentioned in the present invention is the peak or peaks of the distribution curve showing relationship between the amount of the light received by the photosensitive element and the elapse of time (X axis) from the beginning of the carriage movement.

(Embodiment 2)

This embodiment is a modification of the first embodiment; it is different from the first embodiment in that the first mirror unit is different in the roof mirror depth from the second mirror unit. Next, this embodiment will be described in detail.

Figure 10:
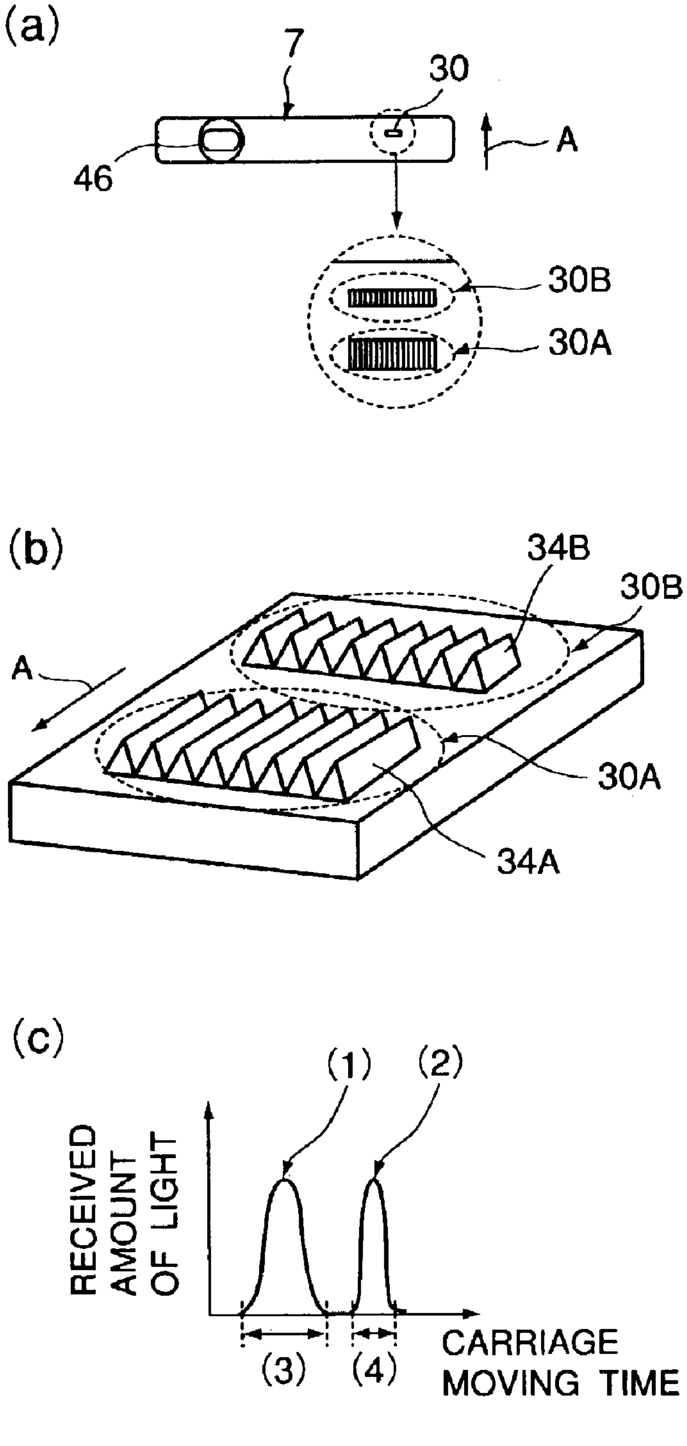
FIG. 10 is a schematic drawing for describing the reflective member of the second embodiment of liquid container in accordance with the present invention, FIG. 10(*a*) being an enlarged plan view of the roof-shaped portion of the reflective member on the bottom surface of the ink container, FIG. 10(*b*) being a perspective view of the bottom surface of the ink container having the reflective member with the roof-shaped mirrors, and FIG. 10(*c*) being a graph showing the distribution of the amount of the light received by the receiving side when the roof-shaped mirrors of the reflective member on the bottom surface of the ink container are arrange in another pattern in accordance with the present invention.

FIG. 10 is a drawing for describing the second embodiment of a reflective member in accordance with the present invention. FIG. 10(*a*) is an enlarged view of the roof mirror portion of the reflective member on the bottom surface of an ink container, and FIG. 10(*b*) is a perspective view of the roof mirror portion of the reflective member. FIG. 10(*c*) is a graph showing the distribution of the amount of the light received by the light receiving side when a liquid container has the second embodiment of a reflective member, the roof mirrors of which are positioned as shown in FIG. 10(*b*).

Referring to FIG. 10(*a*), the reflective member 30 has first and second roof mirror units (reflective members) 30A and 30B, and is on the bottom wall of the ink container 7, with all roof mirrors being arranged in parallel so that their lengthwise direction is parallel to the moving direction A of the ink container 7. In terms of the number, and the angle between at least the two reflective surfaces of each roof mirror, the first and second roof mirror unit 30A and 30B are identical. In terms of the roof mirror depth (dimension in terms of moving direction A), they are different.

As the ink container 7 having the reflective member 30, the roof mirrors of which are in the above described configuration and arrangement, is moved in the direction A by the carriage, the distribution of the amount of the light received by the photosensitive element becomes as shown in FIG. 10(*c*).

In the case of this embodiment, the information regarding each ink container 7, the durations (3) and (4) of the time the reflective light is received are determined by the depths of the roof mirror units 30A and 30B on the bottom surface of the ink container. Thus, the information regarding each ink container can be recognized by detecting the durations (3) and (4) corresponding to the peaks (1) and (2), or the difference between the durations (3) and (4). As for the discrimination among the plurality of ink containers arranged in parallel on the carriage, the reflective member on each ink container is made different from the reflective members on the other ink containers, in terms of the depth of a roof mirror, so that the plurality of ink containers can be differentiated based on the duration of time the reflected light from each roof mirror unit is received, difference between the durations of time corresponding to two roof mirror units on the reflective member, difference, in terms of the duration of time the reflected light is received, among the plurality of ink containers. This method, described above, for identifying an ink container based on the duration of time the reflective light is received has merit in that the duration of time the reflected light is received is not likely to change even if the amount of the reflected light is reduced by the mist, which is a problem peculiar to an ink jet.

(Embodiment 3)

This embodiment is another modification of the first embodiment; it is different from the first embodiment in that the first mirror unit is different in the number of roof mirrors from the second mirror unit. Next, this embodiment will be described in detail.

Figure 11:
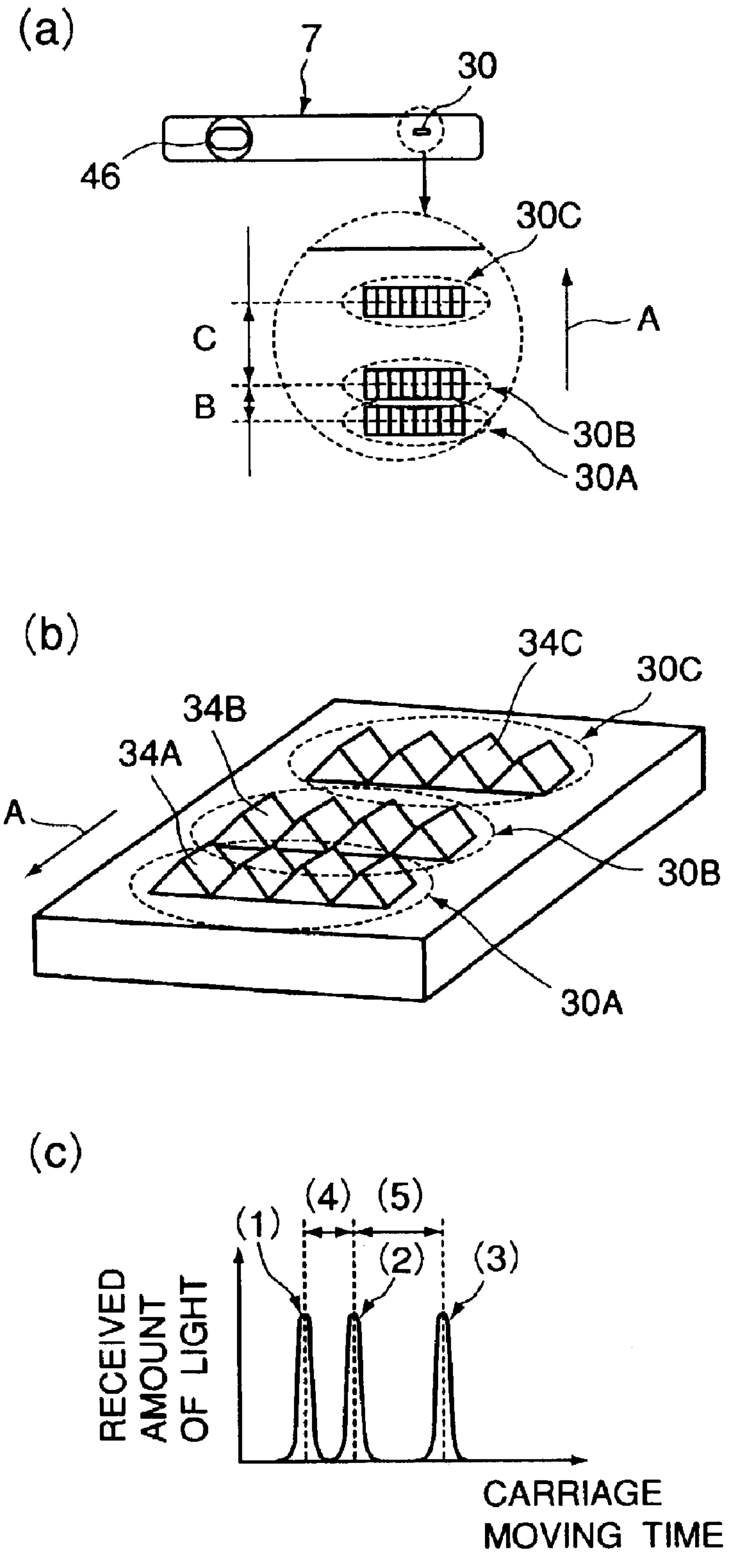
FIG. 11 is a schematic drawing for describing the reflective member of the third embodiment of a liquid container in accordance with the present invention, FIG. 11(*a*) being an enlarged plan view of the roof-shaped portion of the reflective member on the bottom surface of the ink container, FIG. 11(*b*) being a perspective view of the bottom surface of the ink container having the reflective member with the roof-shaped mirrors, and FIG. 11(*c*) being a graph showing the distribution of the amount of the light received by the receiving side when the roof-shaped mirrors of the reflective member on the bottom surface of the ink container are arranged in another pattern in accordance with present invention.

FIG. 11 is a schematic drawing for describing the third embodiment of a reflective member in accordance with the present invention. FIG. 11(*a*) is an enlarged view of the roof mirror portion of the reflective member on the bottom surface of an ink container, and FIG. 11(*b*) is a perspective view of the roof mirror portion of the reflective member. FIG. 11(*c*) is a graph showing the distribution of the amount of the light received by the light receiving side when a liquid container has the third embodiment of a reflective member, in which the roof mirrors are positioned as shown in FIG. 11(*b*).

Referring to FIG. 11, the reflective member 30 has first, second, and third roof mirror units 30A, 30B, and 30C, and is on the bottom wall of the ink container 7, being disposed so that all roof mirrors are parallel to the moving direction A of the ink container 7. In terms of the number of the roof mirrors, roof mirror depth (dimension in terms of carriage movement direction), and angle between at least the two reflective surfaces of a roof mirror, the first, second, and third roof mirror units 30A, 30B, and 30C are the same. However, the pitch B between the first and second mirror units 30A and 30B is different from the pitch C between the second and third mirror unit 30B and 30C.

As the ink container 7 having the reflective member 30, the roof mirror units of which are in the above described arrangement, is moved in the direction A by the carriage, the distribution of the amount of the light received by the photosensitive element becomes as shown in FIG. 11(*c*).

In the case of this embodiment, the pitch (4) between the first and second peaks (1) and (2) is determined by the pitch B between the first and second roof mirror units 30A and 30B, and the pitch (5) between the second and third peaks (2) and (3) is determined by the pitch C between the second and third roof mirror units 30B and 30C. Thus, the information regarding each ink container 7 can be obtained by detecting the number of the peaks (in this case, three: peaks (1), (2), and (3)), and the pitches (4) and (5) between the adjacent two peaks.

Further, the information regarding each ink container can be obtained based on the points in time at which the peaks (1), (2), (3) are detected. In other words, it can be obtained by detecting the absolute position of the reflective member relative to the ink container on which the reflective member is.

Therefore, the plurality of ink containers 7 placed in parallel on the carriage can be identified in terms of the color of the ink therein, by placing a reflective member different, in the number, position, and pitch of the roof mirrors, from the other reflective members, on each of the plurality of ink containers 7, so that they can be identified by detecting the difference in the number of the peaks of the distribution curve of the amount of the reflective light received by the photosensitive element, pitch between the adjacent two peaks of the distribution curve, and timing of the reflective light reception, among them. The number of the peaks of the above described distribution curve can be detected, as long as the amount of the reflected light detected by the photosensitive element is greater than a certain threshold value (threshold value can be set low). Therefore, this identification method, described above, based on the number of the above described peaks, can tolerate the differences among the reflective members which occur during the manufacture of the reflective members, providing the benefit of making it relatively easy to manufacture the reflective members, making therefore it possible to reduce the liquid container cost.

(Embodiment 4)

This embodiment is an example of a reflective member in accordance with the present invention, having only one roof mirror unit which has two subunits different in the angle of the two reflective surfaces of a roof mirror. It is assumed in this case that the measuring area of the sensor on the light receiving side is dividable. Next, the details of this embodiment will be described.

Figure 12:
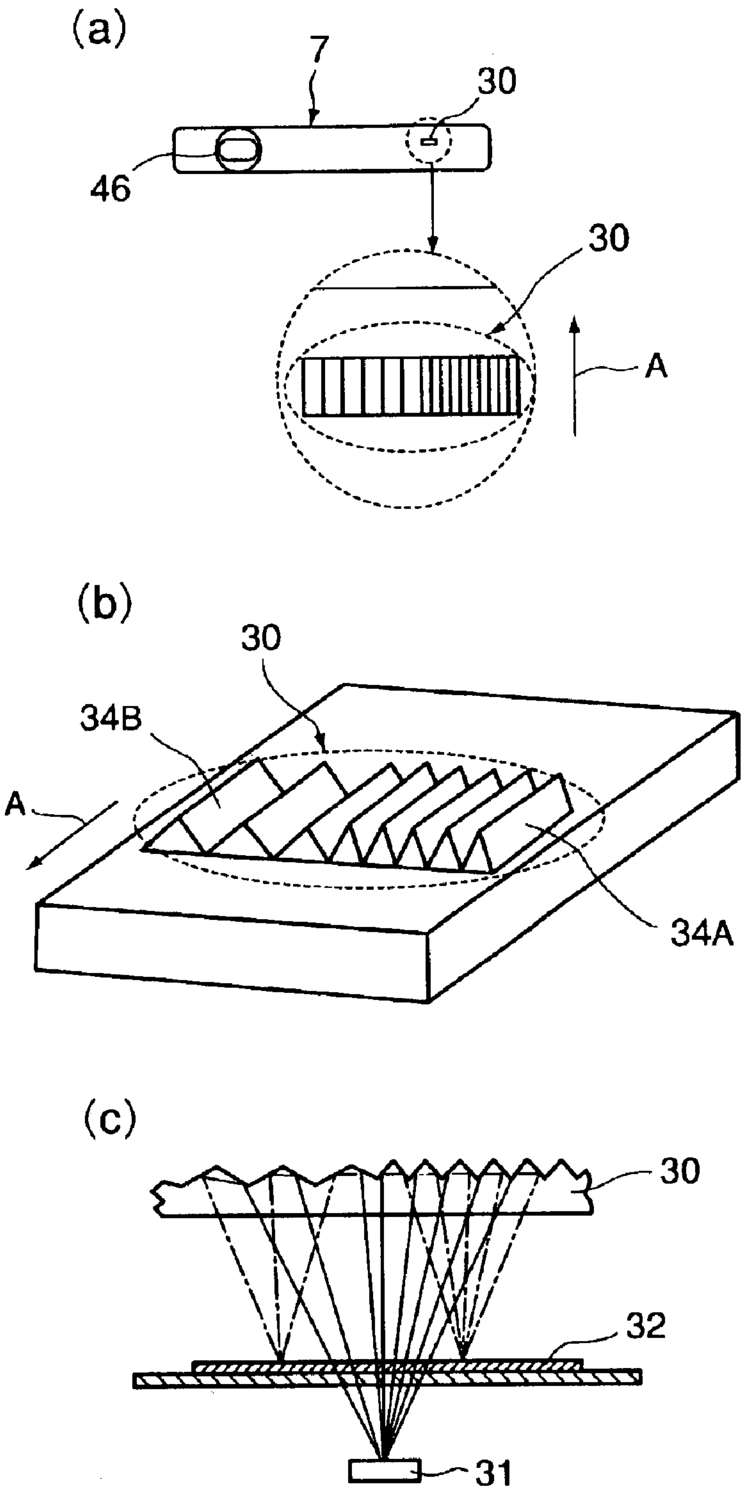
FIG. 12 is a schematic drawing for describing the reflective member of the fourth embodiment of a liquid container in accordance with the present invention, FIG. 12(*a*) being an enlarged plan view of the roof-shaped portion of the reflective member on the bottom surface of the ink container, FIG. 12(*b*) being a perspective view of the bottom surface of the ink container having the reflective member with the roof-shaped mirrors, and FIG. 12(*c*) being a schematic sectional view of the combination of the reflective member and detecting apparatus (photosensitive element, light emitting element), for showing their optical relationship.
Figure 13:
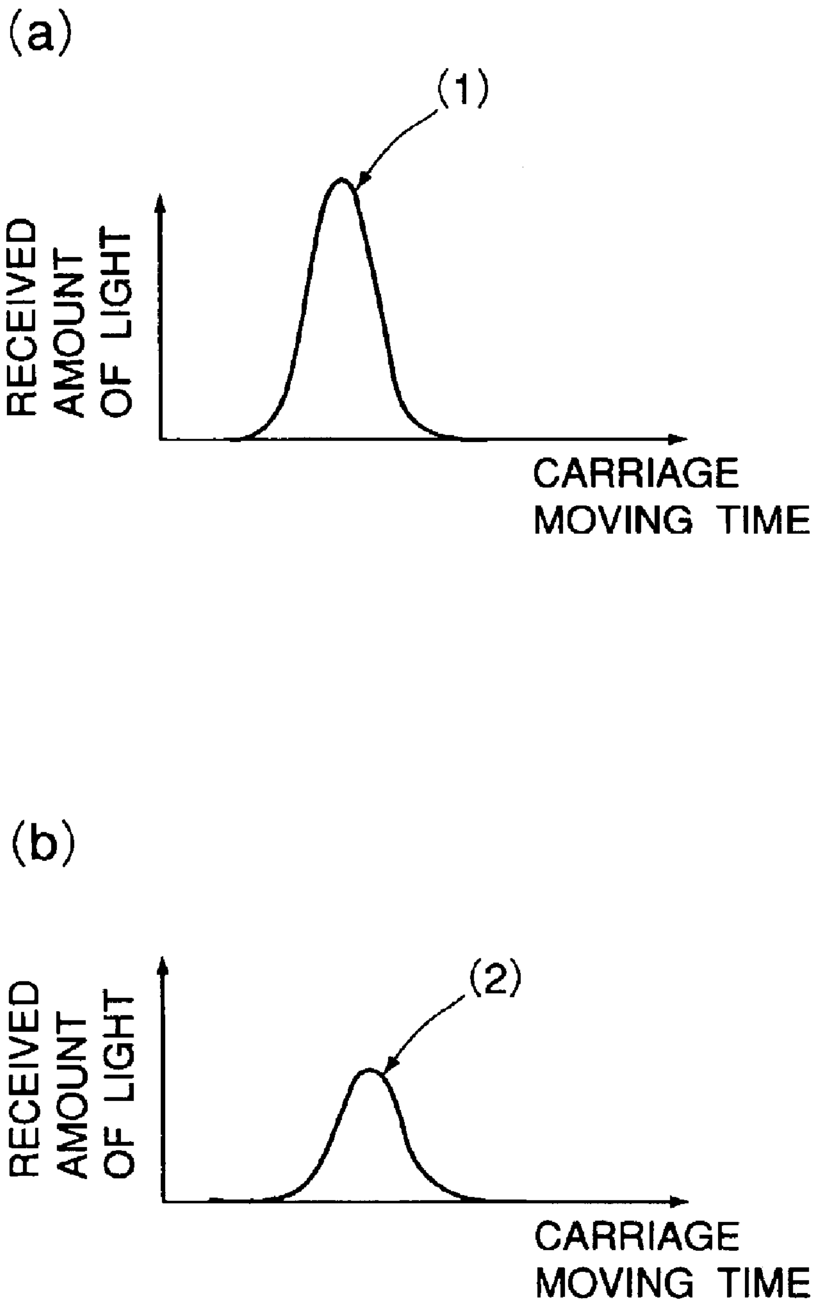
FIGS. 13(*a*) and 13(*b*) are graphs of the amount of the light received by the light receiving side when the roof-shaped mirrors of the reflective member are arranged in accordance with the fourth embodiment of the present invention, for showing the pattern of the distribution of the amount of the light received by the light receiving side.

FIG. 12 is a schematic drawing for describing the fourth embodiment of a reflective member in accordance with the present invention. FIG. 12(*a*) is an enlarged view of the roof mirror portion of the reflective member on the bottom surface of an ink container, and FIG. 12(*b*) is a perspective view of the roof mirror portion of the reflective member in FIG. 12(*a*). FIG. 12(*c*) is a drawing for showing the optical relationship between the reflective member and detecting apparatus (photosensitive element, light emitting element) in this fourth embodiment of the present invention. FIGS. 13(*a*) and 13(*b*) are graphs showing the distribution curves of the amount of the light received by the light receiving side of the fourth embodiment, in which the roof mirrors are disposed as shown in FIG. 12(*b*).

Referring to FIG. 12(*a*), the reflective member 30 has a single roof mirror unit having eight roof mirrors, and is on the bottom wall of the ink container 7, being disposed side by side in parallel so that all roof mirrors are parallel to the moving direction A of the ink container 7. In terms of the depth (dimension in terms of carriage movement direction), all the roof mirrors are the same. However, the reflective member 30 has two sections: a first section having five roof mirrors 34*a*, counting from the right side of the drawing, and a second section having the next three roof mirrors 34*b*. The roof mirror 34*a* and roof mirror 34*b* are different in the angle between at least the two reflective surfaces of a roof mirror.

Referring to FIG. 12(*c*), with the reflective member being structured as described above, the light emitted from the point-source light 31 toward the reflective member 30 is reflected by the first and second sections of the reflective member 30, having the roof mirrors 34*a* and roof mirrors 34*b*, respectively, into two fluxes of reflected light, which are condensed onto the photosensitive element 32. In this embodiment, the point-source light 31 and photosensitive element 32 are disposed within the range of the downward projection of the reflective member 30, as shown in FIG. 12(*c*). However, as long as the roof mirrors 34*a* and roof mirrors 34*b* can be illuminated by the point-source light 31, the point-light source 31 may be disposed outside the range of the detection area of the photosensitive element.

As the ink container 7 having the reflective member 30, the roof mirror units of which are in the above described configuration and arrangement, is moved in the direction A by the carriage, the distribution of the amount of the light received by the portion of the photosensitive element corresponding to the first section (34*a*) of the reflective member 30, and the distribution of the amount of the light received by the portion of the photosensitive element corresponding to the second section (34*b*) of the reflective member 30, become as shown in FIGS. 13(*a*) and 13(*b*), respectively.

Therefore, the information regarding each ink container can be recognized by measuring the amount of the reflective light (1) received by the point of the light receiving side corresponding to the aforementioned first section of the reflective member 30 and the amount of the reflective light (2) received by the point on the light receiving side corresponding to the second section of the reflective member, shown in FIGS. 13(*a*) and 13(*b*), detecting thereby difference in the peak value of the amount of the reflected light between the first and second sections of the reflective member, described regarding the first embodiment (FIG. 9), the duration of the time the reflective light is received by the first and second sections of the reflective member, described regarding the second embodiment (FIG. 10), the pitch between the adjacent peaks, timing of the reflective light reception, difference in the reflective light reception point on the light receiving side between the first and second sections of the reflective member, described regarding the third embodiment (FIG. 11). As for the identification of the plurality of ink containers 7 disposed side by side in parallel on the carriage, a reflective member different, in the angle of the two reflective surfaces of a roof mirror of each of the two sections of the roof mirror portion, number, and position, from the other reflective members, is placed on each of the plurality of ink containers 7, so that they can be identified by detecting the peak values of the reflected light, difference in the peak value of the reflected light among the plurality of ink containers, described regarding the first embodiment, duration of the reflective light reception, difference in the duration of the reflected light reception among the plurality of ink containers, described regarding the second embodiment, pitch between the adjacent peaks of the aforementioned distribution curve, timing of the reflected light reception, difference in the point of the reflective light reception among the plurality of ink containers, described regarding the third embodiment.

In this embodiment, only one reflective member 30 is disposed on each ink container. However, two or more reflective members 30 may be disposed in parallel on each ink container.

(Embodiment 5)

This embodiment is an example of a reflective member in accordance with the present invention, having only one roof mirror unit which has two subunits different in the roof mirror count. It is assumed in this case that the measuring area of the sensor on the light receiving side is dividable. Next, the details of this embodiment will be described.

Figure 14:
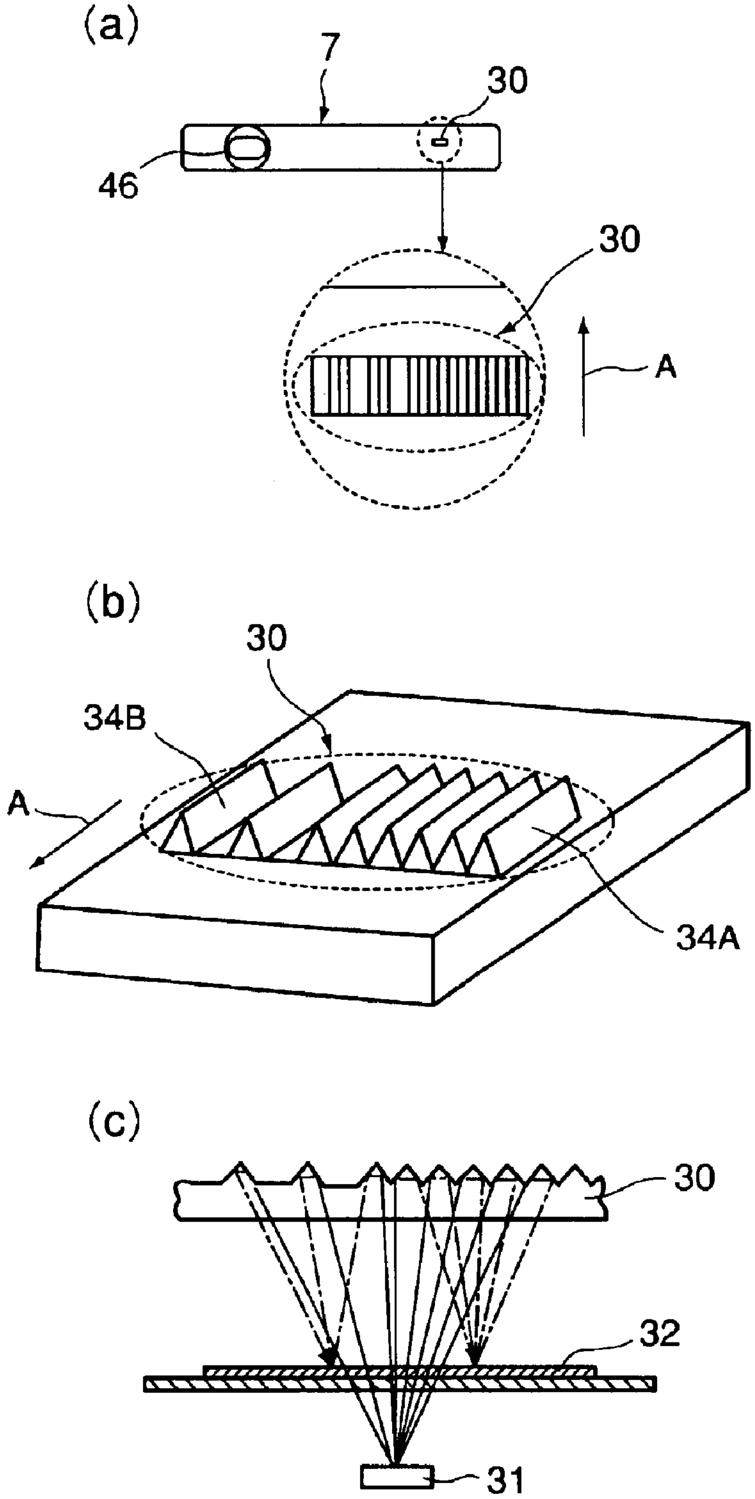
FIG. 14 is a schematic drawing for describing the reflective member of the fifth embodiment of a liquid container in accordance with the present invention, FIG. 14(*a*) being an enlarged plan view of the roof-shaped portion of the reflective member on the bottom surface of the ink container, FIG. 14(*b*) being a perspective view of the bottom surface of the ink container having the reflective mirror with the roof-shaped mirrors, and FIG. 14(*c*) being a schematic sectional view of the combination of the reflective member and detecting apparatus (tight sensing element, light emitting element), for showing their optical relationship.

FIG. 14 is a schematic drawing for describing the fifth embodiment of a reflective member in accordance with the present invention. FIG. 14(*a*) is an enlarged view of the roof mirror portion of the reflective member on the bottom surface of an ink container, and FIG. 14(*b*) is a perspective view of the roof mirror portion of the reflective member in FIG. 14(*a*). FIG. 14(*c*) is a drawing for showing the optical relationship between the reflective member and detecting apparatus (photosensitive element, light emitting element) in this fifth embodiment of the present invention. FIGS. 14(*a*) and 14(*b*) are graphs showing the distributions of the amount of the light received by the light receiving side of the fifth embodiment, in which the roof mirrors are disposed as shown in FIG. 14(*b*). Referring to FIG. 14(*a*), like the fourth embodiment, this embodiment of a reflective member 30 has a single roof mirror unit having eight roof mirrors, and is on the bottom wall of the ink container 7, being disposed so that all roof mirrors are parallel to the moving direction A of the ink container 7. In terms of the depth (dimension in terms of carriage movement direction), all the roof mirrors are the same. However, the reflective member 30 has two sections: first section having five roof mirrors 34*a*, counting from the right side of the drawing, and second section having the next three roof mirrors 34*b*. Unlike the fourth embodiment, the first and second sections (34*a*) and (34*b*) of this embodiment of the reflective member 30 are different in the roof mirror pitch, although they are the same in the angle between at least the two reflective surfaces of each roof mirror.

Referring to FIG. 14(*c*), with the reflective member being structured as described above, the light emitted from the point-source light 31 toward the reflective member 30 is divisively reflected by the first and second sections of the reflective member 30, having the roof mirrors 34*a* and roof mirrors 34*b*, respectively, into two fluxes of reflected light, which are condensed onto the photosensitive element 32. In this embodiment, the point-source light and photosensitive element 32 are disposed within the range of the downward projection of the reflective member 30, as shown in FIG. 14(*c*). However, as long as the roof mirrors 34*a* and roof mirrors 34*b* can be illuminated by the point-source light 31, the point-light source 31 may be disposed outside the range of the detection area of the photosensitive element.

Figure 15:
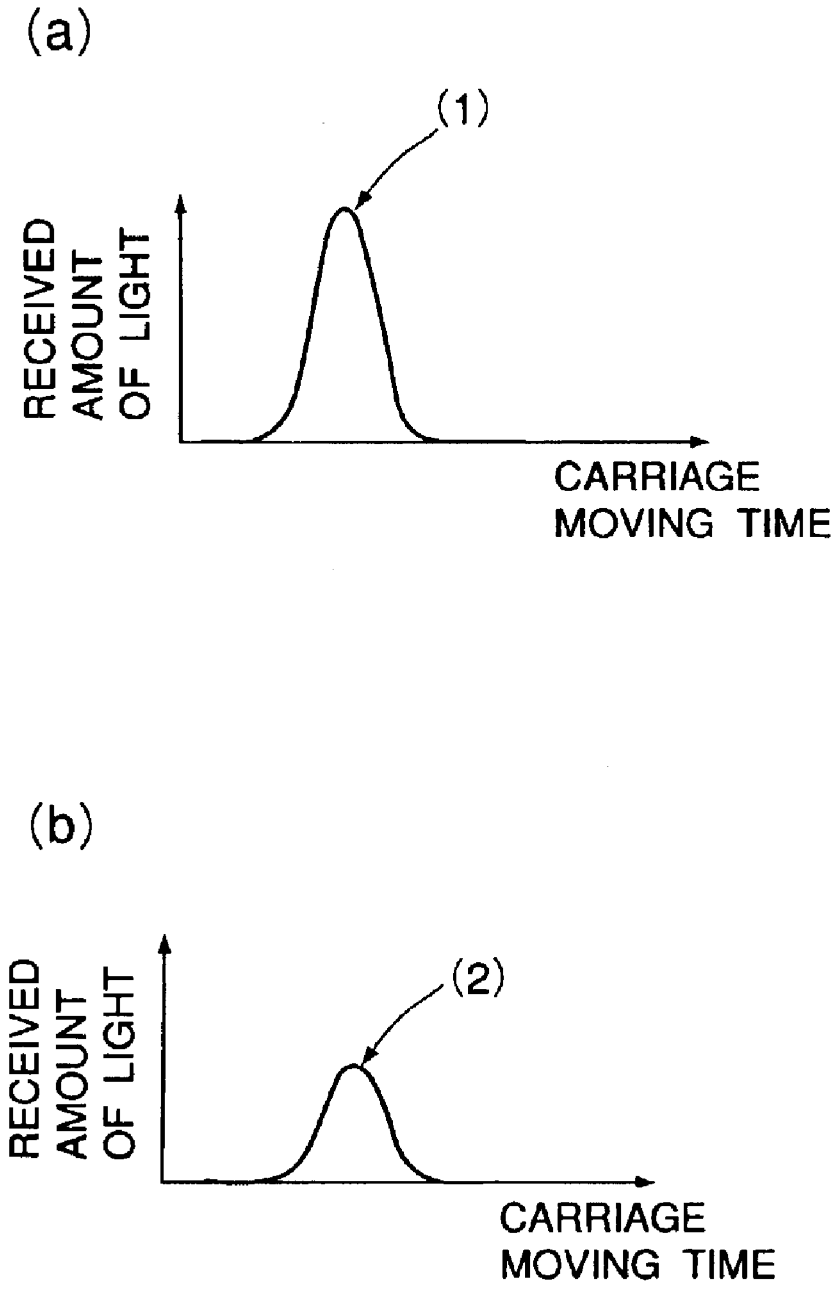
FIGS. 15(*a*) and 15(*b*) are graphs showing the distribution of the amount of the light received by the light receiving side when the bottom surface of the ink container is provided with the fifth embodiment of a reflective member with roof-shaped mirrors in accordance with the present invention.

As the ink container 7 having the reflective member 30, the roof mirror units of which are in the above described configuration and arrangement, is moved in the direction A by the carriage, the distribution of the amount of the light received by the portion of the photosensitive element corresponding to the first section (34*a*) of the reflective member 30, and the distribution of the amount of the light received by the portion of the photosensitive element corresponding to the second section (34*b*) of the reflective member 30, become as shown in FIGS. 15(*a*) and 15(*b*), respectively.

Therefore, the information regarding each ink container can be recognized by measuring the amount of the reflective light (1) received by the point of the light receiving side corresponding to the aforementioned first section of the reflective member 30 and the amount of the reflective light (2) received by the point on the light receiving side corresponding to the second section of the reflective member, shown in FIGS. 13(*a*) and 13(*b*), detecting thereby difference in the peak value of the amount of the reflected light between the first and second sections of the reflective member, described regarding the first embodiment (FIG. 9), the duration of the time the reflective light is received by the first and second sections of the reflective member, described regarding the second embodiment (FIG. 10), the pitch between the adjacent peaks, timing of the reflective light reception, difference in the reflective light reception point on the light receiving side between the first and second sections of the reflective member, described regarding the third embodiment (FIG. 11). As for the identification of the plurality of ink containers 7 disposed side by side in parallel on the carriage, a reflective member different, in the roof mirror count and roof mirror pitch, from the other reflective members, is placed on each of the plurality of ink containers 7, so that they can be identified by detecting the peak values of the reflected light, difference in the peak value of the reflected light among the plurality of ink containers, described regarding the first embodiment, duration of the reflective light reception, difference in the duration of the reflected light reception among the plurality of ink containers, described regarding the second embodiment, pitch between the adjacent peaks of the aforementioned distribution curve, timing of the reflected light reception, difference in the point of the reflective light reception among the plurality of ink containers, described regarding the third embodiment.

In this embodiment, only one reflective member 30 is disposed on each ink container. However, two or more reflective members 30 may be disposed in parallel on each ink container.

(Embodiment 6)

This embodiment of a reflective member in accordance with the present invention is a modification of the first to fifth embodiments, in terms of the reflective member arrangement. More specifically, the two roof mirror units which are disposed in the preceding embodiments are disposed perpendicular to each other. Next, the details of this embodiment will be described.

Figure 16:
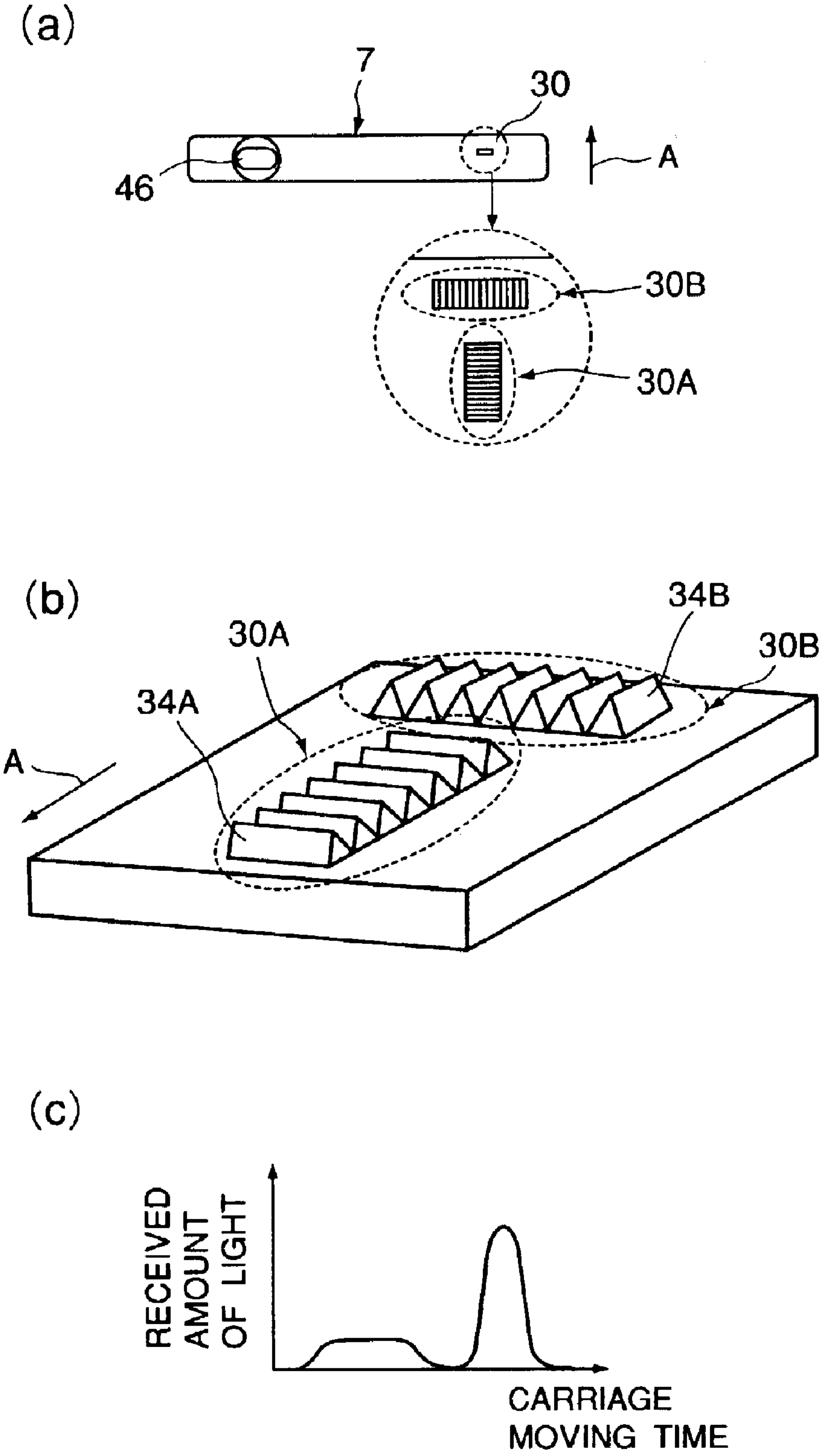
FIG. 16 is a schematic drawing for describing the reflective member of the first embodiment of a liquid container in accordance with the present invention, FIG. 16(*a*) being an enlarged plan view of the roof-shaped portion of the reflective member on the bottom surface of the ink container, FIG. 16(*b*) being a perspective view of the bottom surface of the ink container having the reflective member with the roof-shaped mirrors, and FIG. 16(*c*) being a graph showing the distribution of the amount of the light received by the receiving side when the bottom surface of the ink container is provided with the sixth embodiment of a reflective member with the roof-shaped mirrors in accordance with the present invention.

FIG. 16 is a schematic drawing for describing the sixth embodiment of a reflective member in accordance with the present invention. FIG. 16(*a*) is an enlarged view of the roof mirror portion of the reflective member on the bottom surface of an ink container, and FIG. 16(*b*) is a perspective view of the roof mirror portion of the reflective member in FIG. 16(*a*). FIG. 16(*c*) is a graph showing the distribution of the amount of the light received by the light receiving side, on which the roof mirrors are disposed as shown in FIG. 16(*b*).

Referring to FIG. 16(*a*), the reflective member 30 has first and second roof mirror units 30A and 30B, which are disposed in such a manner that the roof mirrors of the first mirror unit 30A are perpendicular to the roof mirrors of the second roof mirror unit 30A. More specifically, the roof mirrors 34*a* making up the first roof mirror unit 30A are perpendicular to the moving direction A of the ink container 7, whereas the roof mirrors 34*b* making up the second roof mirror unit 30B are parallel to the moving direction OF the ink container 7. In terms of the depth (dimension in terms of carriage movement direction), roof mirror count, and angle between at least two reflective surfaces of a roof mirror, the first and second roof mirror units 30A and 30B are the same. In order to make it possible to identify each ink container, however, it is necessary to make each ink container different from other ink container, in one or more aspects, for example, roof mirror depth, roof mirror count, angle between the two reflective surfaces of a roof mirror, roof mirror pitch, etc., as presented in the descriptions of the preceding embodiments.

As the ink container 7 having the reflective member 30, the roof mirror units of which are in the above described configuration and arrangement, is moved in the direction A by the carriage, the distribution of the amount of the light received by the light receiving side becomes as shown in FIG. 16(*c*). This distribution of the amount of the light received by the photosensitive element is analyzed by the detecting apparatus to recognize the information regarding each ink container.

Also in the case of this embodiment, the plurality of ink containers can be identified in terms of the color of the ink therein with the use of the various ink container identifying methods described regarding the preceding embodiments, based on the characteristics of the pattern of the distribution curve of the amount of the reflected light received on the photosensitive element side, for each ink container.

(Embodiment 7)

Figure 17:
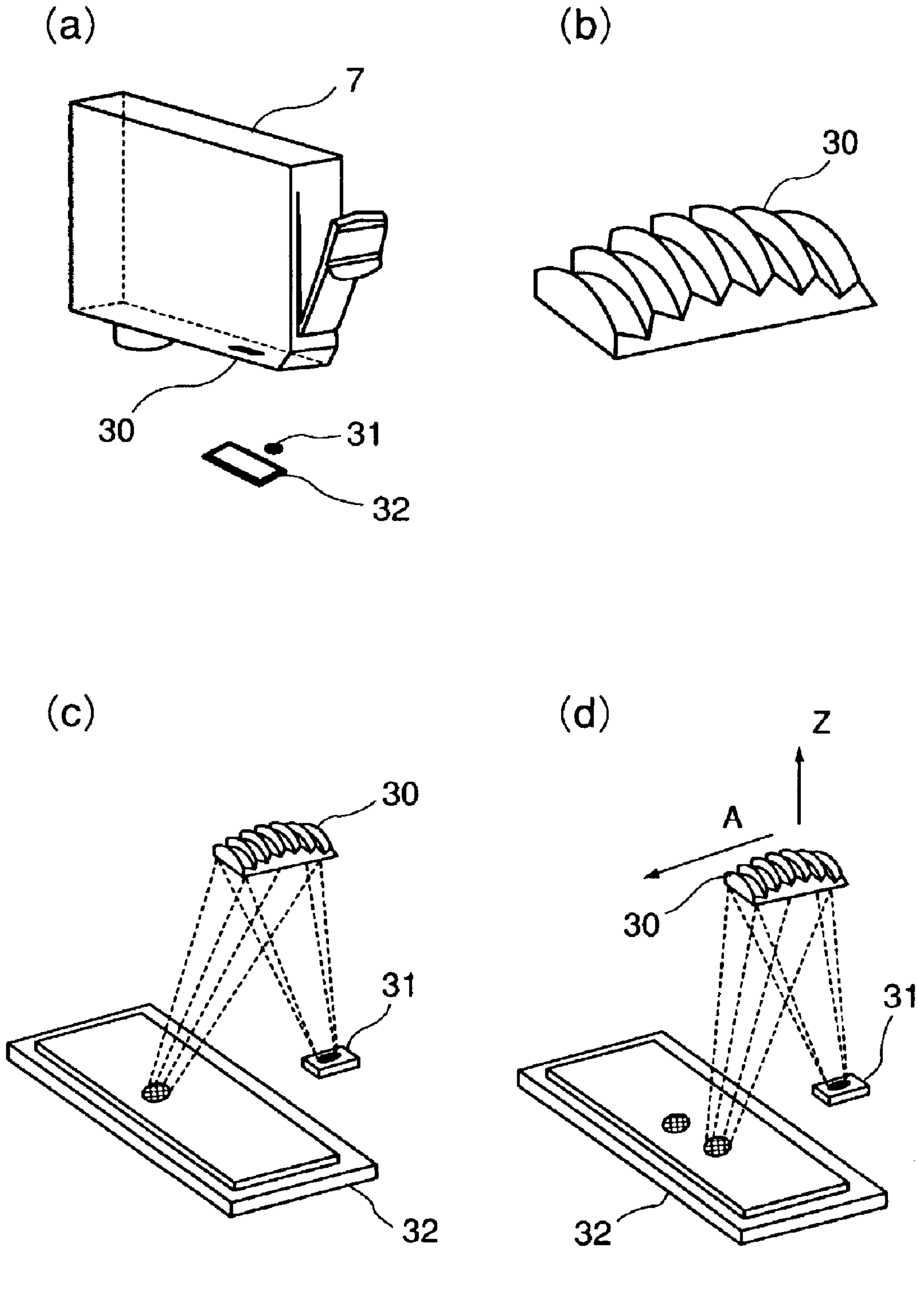
FIG. 17 is a schematic drawing for describing the detection of the state ("floating") of the seventh embodiment of a liquid container in accordance with the present invention, FIG. 17(*a*) being a perspective of the reflective member on the bottom surface of the ink container, and the light emitting element and photosensitive elements, FIG. 17(*b*) being an enlarged view of the roof-shaped unit constituting the reflective member on the bottom surface of the ink container, FIG. 17(*c*) being a schematic drawing for showing the light paths from the light emitting element to the photosensitive element, and FIG. 17(*d*) being a schematic drawing for showing the shifting of the light paths due to the "floating" of the ink container.

FIG. 17 is a drawing for describing the positioning (improper positioning; for example, "floating") of a liquid container in accordance with the present invention, relative to the liquid container mounting portion of an ink jet recording apparatus. FIG. 17(*a*) is a drawing for showing the reflective member on the bottom surface of the ink container, light emitting element, and photosensitive element. FIG. 17(*b*) is an enlarged perspective view of the roof mirror unit making up the reflective member on the bottom surface of the ink container. FIG. 17(*c*) is a drawing for showing the light path through which the light from the light emitting element is condensed onto the photosensitive element. FIG. 17(*d*) is a drawing for showing the light path through which the light from the light emitting element is condensed onto the photosensitive element, when the ink container is "floating". Next, the details of this embodiment will be described.

Referring to FIG. 17(*a*), the roof mirror unit (reflective member) 30 is on the bottom surface of the ink container 7, with its roof mirrors being perpendicular to the moving direction A of the ink container (carriage movement direction). Obviously, the direction in which the roof mirror unit is aligned is not limited to this direction; there are various ways of positioning the roof mirrors as in the first to sixth embodiments. This embodiment is characterized in that, in terms of the cross section perpendicular to the moving direction of the ink container 7, each roof mirror is given such a dome shape that the center of its curvature is on the ink container side, as shown in FIG. 17(*b*), and also that, in terms of the cross section parallel to the moving direction of the ink container, the reflective portion of the roof mirror unit (reflective member) is given such a dome shape that the center of its curvature is on the ink container side, as shown in FIG. 17(*b*). Referring to FIG. 17(*c*), as the light emitted divergently from the light emitting element is reflected by the roof mirror, or roof mirror unit (reflective member), structured as described above, it two-dimensionally condenses onto the light receiving side. Referring to FIG. 17(*d*), if the ink container is "floating" in the Z direction, the light reflected by the reflective member two-dimensionally condenses onto the spot on the photosensitive element, different from the spot onto which it would have condensed when the ink container was not "floating". Whether an ink container is in the normal position or "floating" can be detected by reading the amount of the deviation of the spot on the photosensitive element, onto which the light reflected by the reflective member of the ink container condenses, from the normal spot.

(Miscellanies)

For the ease of description, the distribution of the amount of the diffracted portion of the light received by the photosensitive element is not shown in the graphs (FIGS. 9(*c*), 10(*c*), 11(*c*), 13, 15, and 18) presented for the description of the preceding embodiments.

Figure 18:
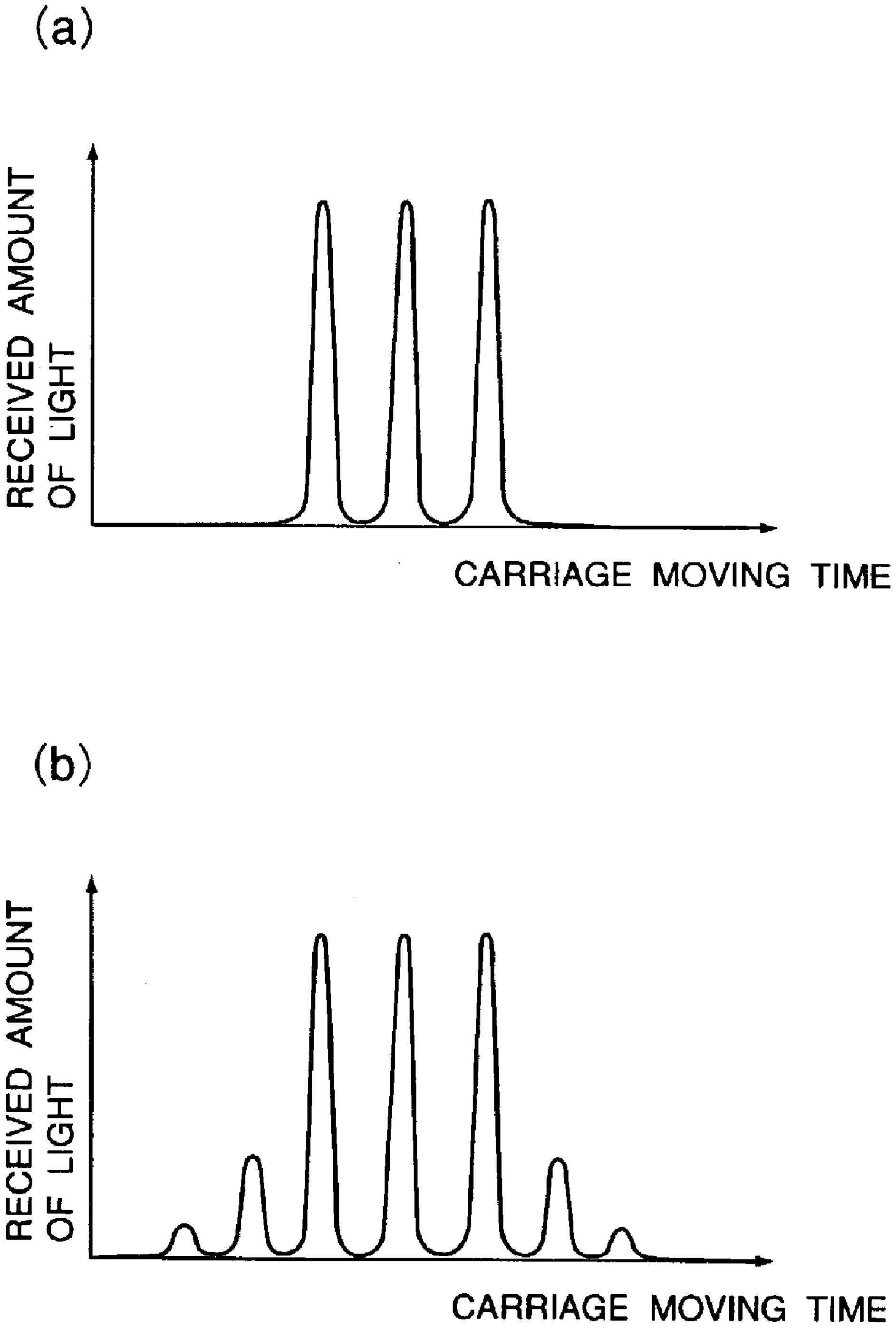
FIGS. 18(*a*) and 18(*b*) are graphs of the amount of the light received by the photosensitive element, for showing the occurrence of the diffraction of the light from the light emitting element.
Figure 19:
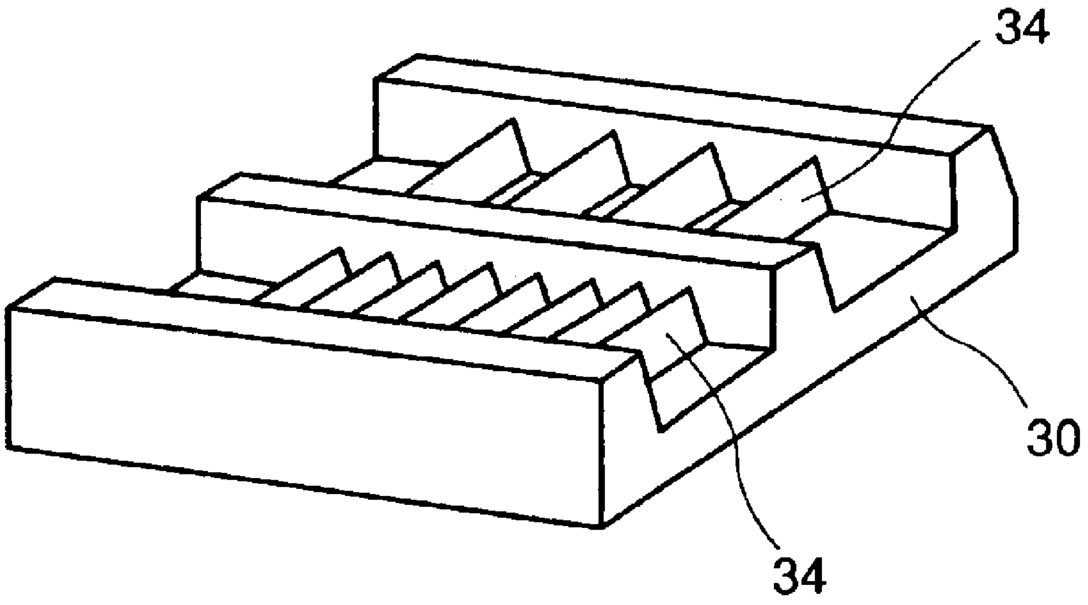
FIG. 19 is a perspective view of one of the modifications of a reflective member for a liquid container in accordance with the present invention, in terms of the pattern in which the roof-shaped mirrors are arranged.

FIG. 18 is a drawing for describing the distribution of the amount of the diffracted portion of the light received by the photosensitive element. Referring to FIG. 18(*a*), it is assumed that the distribution curve of the amount of the primary light received by the photosensitive element has three peaks. In reality, however, there will be other peaks, resulting from diffraction, before and after the three primary peaks, in terms of the time having elapsed from the beginning of the movement of the carriage, as shown in FIG. 18(*b*). This secondary light resulting from the diffraction of the primary light can be read by the various ink container identification methods used with the first to sixth embodiments, in order to provide additional ink container identification methods.

More specifically, by setting the sensitivity, or threshold, of the photosensitive element, to a value smaller than the peak value of the amount of the diffractive light arriving at the photosensitive element, this diffracted portion of the light can be detected; in other words, it can be recognized as a part of the light reflected by the reflective member. Therefore, it can be read by the ink container identification methods in accordance with the first and sixth embodiments, in order to provide additional methods for identifying an ink container in terms of the color of the ink therein. Further, when the distribution curve of the amount of the primary light received by the photosensitive element has three peaks as shown in FIG. 18(*a*), there is, in reality, the peak of the distribution curve of the diffractive light between the adjacent peaks of the primary light. However, these peaks are hidden by the peaks of the primary light. Therefore, the peaks of the distribution curve of the amount of the diffractive light, which are lower than the peaks of the primary light, appears only before and after the three peaks of the primary light, in terms of the time having elapsed after the beginning of the movement of the ink container (carriage), as shown in FIG. 18(*b*). In other words, if a structural arrangement is made to increase the pitch of the three peaks of the distribution curve for the primary light, the peaks of the distribution curve for the diffractive light in order to make it possible to recognize the diffractive light as a part of the reflected light, it is possible to read the diffractive light as well with the use of the above described ink container identification methods in accordance with the first to sixth embodiments in order to provide additional ink container identification methods.

Figure 20:
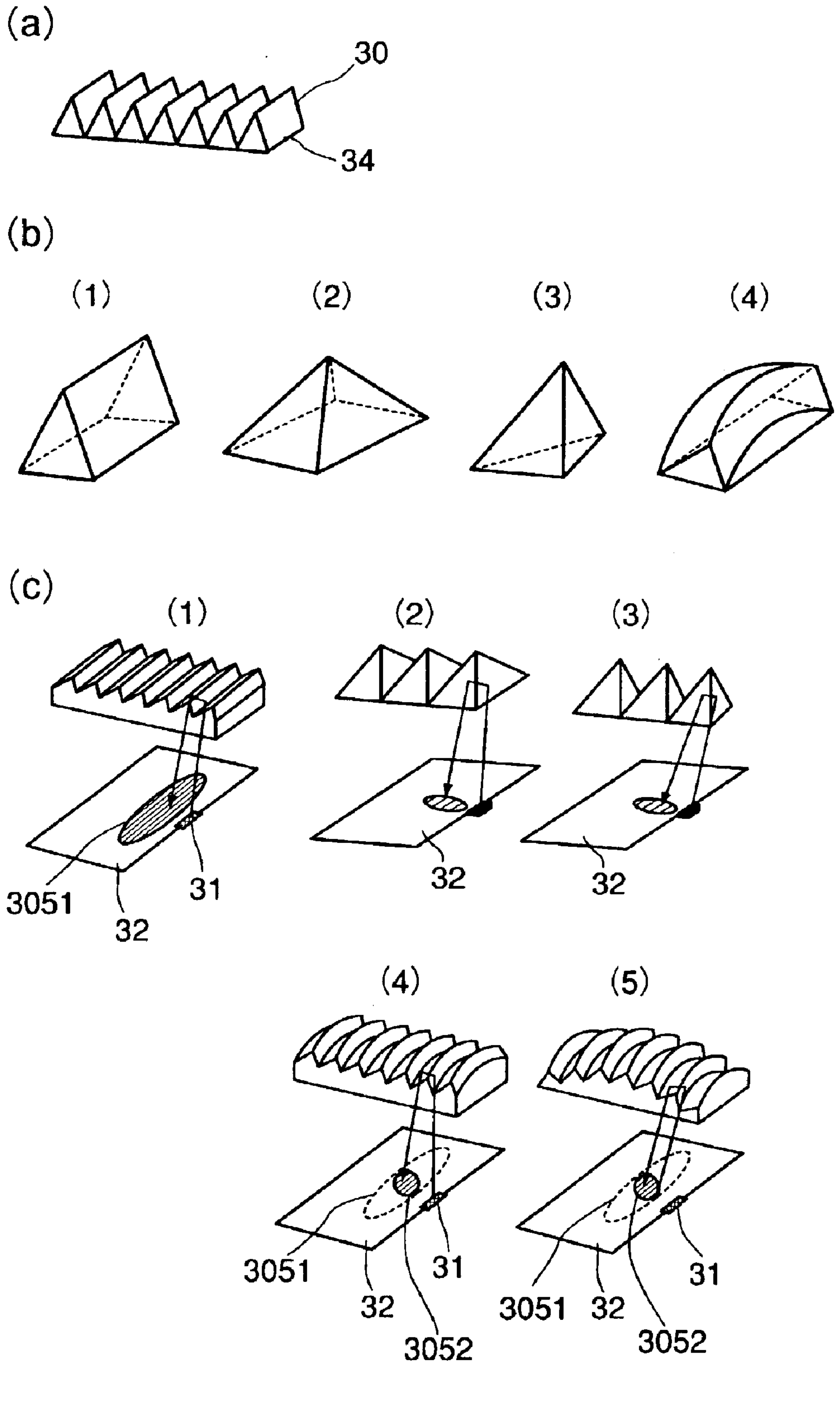
FIGS. 20(*a*) through 20(*c*) show various modifications, in terms of configuration, of the roof-shaped mirror for a reflective member for a liquid container in accordance with the present invention.

In the case of each of the preceding embodiments, the reflective member employed a plurality of roof mirrors, which are shaped as shown in FIG. 20(*b*-1) and are arranged as shown in FIG. 20(*a*). Also, the light from the light emitting element is condensed onto the photosensitive element by being deflected twice by the roof mirror. However, the configuration of the roof mirror employed by the reflective member in accordance with the present invention does not need to be limited to the above described one. For example, it may be in the shape (triangular-polygonal pyramid) shown in FIG. 20(*b*-2), or FIG. 20(*b*-3). Further, it may be in the shape shown in FIG. 20(*b*-4) (roof mirror is formed on cylindrical surface). Also in these cases, the light from the light emitting element can be deflected twice as shown in FIGS. 20(*c*-2), 20(*c*-3), 20(*c*-4), and 20(*c*-5). Further, in the case of the preceding embodiments, the light from the light emitting element is deflected only twice. However, even if the light from the light emitting element is deflected more than twice due to the employment of a polygonal pyramid, it is possible to obtain the same effects as those obtained by the preceding embodiments.

In all of the first to sixth embodiments, the ink container had two or more reflective members. It is obvious that even if a given ink container has only one reflective member, it is possible to identify the ink container as it is in the case of the first to sixth embodiments. In comparison, the seventh embodiment has only one reflective member. However, even if the seventh embodiment has two or more reflective members, it can be detected as it can be detected when it has only one reflective member.

Further, in the case of the structure of each of the first to seventh embodiments, the number and configuration of a reflective member, as well as how a plurality of reflective members are arranged in combination, are optional, as long as the space is available on the ink container. It is also possible to selectively combine the preceding embodiments according to ink color. For example, it is possible to employ an ink container having the first embodiment of a reflective member, as the ink container for magenta ink, and an ink container having the second embodiment of a reflective member, as the ink container for yellow ink.

Also in the case of the structure of each of the first to seventh embodiments, the reflective member is in the recess of the bottom wall of the ink container in such a manner that the processed surface (side having roof mirrors) of the reflective member faces the bottom of the recess, with the presence of a layer of gas between the processed surface and the bottom of the recess. Although it is costly, the same effects as those obtained by the preceding embodiments can be obtained even if the need for this layer of gas is eliminated by depositing aluminum, or the like, on the processed surface of the reflective member, or by disposing the reflective member on the bottom surface of the ink container in such a manner that the processed surface of the reflective member faces outward of the ink container. In other words, the choice and placement of a reflective member are optional; they may be determined according to usage.

Also in the case of the structure of each of the first to seventh embodiments, the amount of the reflected light from the reflective member is detected as the ink container is moved. However, the detecting apparatus having the light emitting element and photosensitive element may be moved instead of moving the ink container. The resultant effects are the same as those obtained by the preceding embodiments. Further, the light emitting element and photosensitive element may be discrete from each other as in the preceding embodiments, or may be integral.

As for the information to be identified based on the above described pattern of the roof mirrors of the reflective member of the ink container, the manufacture date, types (color, model), properties (dye, pigment, viscosity, etc.), etc., are possible.

Lastly, referring to FIG. 21, an example of an ink jet recording apparatus, in which any of the above described ink containers is mountable will be described.

The recording apparatus shown in FIG. 21 is an ink jet recording apparatus, in which a plurality of ink containers equipped with the reflective member 30 having a single or plurality of the above described roof mirrors 34 are removably mountable. It comprises: a carriage 81, on which a head holder 200 having an ink jet recording head (unshown) is mounted; a head recovery unit 82 comprising a head cap for preventing the ink in the plurality of the orifices of the ink jet recording head, from drying, and a suction pump for suctioning the ink in the plurality of the orifices of the recording head as the recording head begins to improperly operate; and a sheet supporting plate 83 on which recording paper as recording medium is conveyed.

The home position of the carriage 81 is where it aligns with the recovery unit 82. The carriage 81 is moved leftward of the drawing, in a scanning manner, as a belt 84 is driven by a motor or the like. While the carriage 81 is moved in a scanning manner, ink is ejected from the head toward the recording paper on the sheet supporting plate (platen) 83, forming an image on the recording paper.

As described above, according to the present invention, a liquid container is provided with a reflective member having a plurality of roof mirrors, at least two reflective surfaces of which are positioned at a predetermined angle relative to each other, and which are disposed side by side in parallel so that their reflective surfaces are intersectional to a predetermined direction. Therefore, the light which enters the reflective member is divided by the plurality of roof mirrors into a plurality of fluxes of light, which are condensed onto predetermined spots, one for one. Therefore, the application of the present invention makes it possible to increase the reflective efficiency of a reflective member without performing a special process, for example, vapor deposition of reflective film, or the like, on the reflective surface of the reflective member, making therefore it possible to reduce reflective member cost.

Further, the pattern of the distribution curve of the amount of the reflective light received by the photosensitive element can be varied in a large number of ways by varying the roof mirrors of the reflective member in specifications (pattern, count, width, etc.). Therefore, a plurality of reflective members different in the specifications (pattern, count, width, etc.) can be attached to a plurality of liquid containers, one for one, so that each liquid container can be identified in the color of the ink therein, based on the pattern, more specifically, positions of peaks, pitch of peaks, magnitude of peaks, etc., of the distribution curve of the amount of the reflective light received by the photosensitive element, and also so that whether or not each liquid container is in its proper position in an apparatus can be detected from the deviation of the spot, to which the light reflected by the reflective member of a given liquid container condenses, from the normal spot.

In other words, according to the present invention, it is possible to prevent a given liquid container from being erroneously mounted into an apparatus, more specifically, from being mounted into the liquid container mounting portion for a liquid container different in the color of the ink therein, or from being incompletely mounted in the apparatus, preventing therefore the apparatus from printing an incorrect image.

While the invention has been described with reference to the structures disclosed herein, it is not confined to the details set forth, and this application is intended to cover such modifications or changes as may come within the purposes of the improvements or the scope of the following claims.

What is claimed is:

1. A liquid container for containing liquid, comprising:

a reflection member having a plurality of roof mirror assemblies arranged in a predetermined direction, each of said roof mirror assemblies having at least two reflecting surfaces positioned with a predetermined angle therebetween;

wherein said reflection member is effective to divide incident light into a plurality of light beams by said plurality of roof mirror assemblies and to condensing at a predetermined position the beams sequentially reflected by the at least two reflecting surfaces of the roof mirror assemblies.

2. A container according to claim 1, wherein the incident light which is divergent is reflected and condensed one- or two-dimensionally by said reflection member.

3. A container according to claim 2, further comprising an additional roof mirror assembly having reflecting surfaces which are positioned at a different predetermined angle such that reflected light which converges one- or two-dimensionally is divided and converged to different areas.

4. A container according to claim 3, wherein a light emitting element is disposed in a projected area of said reflection member below said reflection member such that reflected light is divided and converged to different areas.

5. A container according to claim 2, wherein the plurality of said reflection members are disposed so that reflected light which converges one- or two-dimensionally is divided and converged to different areas.

6. A container according to claim 1, wherein said reflection member includes at least two roof mirror assemblies having depths which are different from each other.

7. A container according to claim 1, further comprising an additional reflection member having a different number of roof mirror assemblies.

8. A container according to claim 1, further comprising an additional reflection member having reflecting surfaces positioned at a different angle.

9. A container according to claim 1, wherein a space is provided at a position of contact relative to said roof mirror assembly.

10. A liquid ejection type recording apparatus for effecting recording by ejection of liquid from a liquid container, said apparatus comprising a carriage capable of carrying said liquid container which has a structure as defined in any one of claims 1–5, 6–8 first detecting means for discriminating said liquid container; and second detecting means for detecting a mounting state of said liquid container in said apparatus.

11. An apparatus according to claim 10, wherein said first and second detecting means include point light source means and light receiving means.

12. An apparatus according to claim 11, wherein light source means emit divergent light.

13. An apparatus according to claim 12, wherein said light source means and said light receiving means are integral with each other.

14. A discriminating method for a liquid container for containing liquid, wherein said liquid container includes a reflection member having a plurality of roof mirror assemblies arranged in a predetermined direction, each of said roof mirror assemblies having at least two reflecting surfaces positioned with a predetermined angle therebetween, and said reflection member divides incident light into a plurality of light beams by said plurality of roof mirror assemblies so that light beams reflected sequentially by at least two reflecting surfaces of each of said roof mirror assemblies are condensed at predetermined positions, said method comprising:

discriminating said liquid container on the basis of a distribution pattern of the reflected light constituted by the condensed light beams.

15. A method according to claim 14, wherein information relating to said liquid container is discriminated on the basis of a width of the reflected light from said reflection member.

16. A method according to claim 14, wherein information relating to said liquid container is discriminated on the basis of a number of the reflected light portions having peaks.

17. A method according to claim 14, wherein information relating to said liquid container is discriminated on the basis of a pitch of a pattern of the reflected light.

18. A method according to claim 14, wherein said liquid container is discriminated on the basis of a difference in peak values of the reflected light from said reflection member.

19. A method according to claim 14, wherein said liquid container is discriminated on the basis of a difference in widths of the reflected light from said reflection member.

20. A method according to claim 14, wherein said liquid container is discriminated on the basis of a difference in numbers of the reflected light from said reflection member.

21. A method according to claim 14, wherein said liquid container is discriminated on the basis of intervals of the reflected light from said reflection member.

22. A method according to claim 14, wherein the information relating to said liquid container is discriminated on the basis of diffracted light from said reflection member.

23. A method for detecting a mounting state of a liquid container for containing liquid, wherein said liquid container includes a reflection member having a plurality of roof mirror assemblies arranged in a predetermined direction, each of said roof mirror assemblies having at least two reflecting surfaces positioned with a predetermined angle therebetween, and wherein said reflection member is effective to divide incident light into a plurality of light beams by said plurality of roof mirror assemblies and to condensing at a predetermined position the beams sequentially reflected by the at least two reflecting surfaces of the roof mirror assemblies, said method comprising:

detecting a mounting state of said liquid container on the basis of a change in a position of the reflected light constituted by the condensed light beams.

* * * * *